US011609893B1

(12) United States Patent
Anderson et al.

(10) Patent No.: US 11,609,893 B1
(45) Date of Patent: Mar. 21, 2023

(54) SYSTEMS AND METHODS FOR GENERATING AND MODIFYING A PATTERN FOR PATTERN MATCHING UTILIZING A HIERARCHICAL STRUCTURE THAT STORES ONE OR MORE VALUES

(71) Applicant: The MathWorks, Inc., Natick, MA (US)

(72) Inventors: Curtis Anderson, Natick, MA (US); Jason Breslau, Holliston, MA (US)

(73) Assignee: The MathWorks, Inc., Natick, MA (US)

( * ) Notice: Subject to any disclaimer, the term of this patent is extended or adjusted under 35 U.S.C. 154(b) by 176 days.

(21) Appl. No.: 16/884,615

(22) Filed: May 27, 2020

(51) Int. Cl.
*G06F 16/22* (2019.01)
*G06F 16/28* (2019.01)
*G06F 16/242* (2019.01)
*G06F 16/21* (2019.01)
*G06F 16/2452* (2019.01)

(52) U.S. Cl.
CPC ........ *G06F 16/2246* (2019.01); *G06F 16/213* (2019.01); *G06F 16/2445* (2019.01); *G06F 16/2452* (2019.01); *G06F 16/285* (2019.01)

(58) Field of Classification Search
USPC ........................................................ 707/760
See application file for complete search history.

(56) References Cited

U.S. PATENT DOCUMENTS

| | | | | |
|---|---|---|---|---|
| 7,106,897 | B1* | 9/2006 | McIntyre | G06V 10/46 382/199 |
| 8,745,076 | B2* | 6/2014 | Pazdziora | G06F 16/242 707/759 |
| 2006/0085389 | A1* | 4/2006 | Flanagan | G06F 16/90344 707/999.005 |
| 2010/0306273 | A1* | 12/2010 | Branigan | G06F 16/81 707/673 |

(Continued)

OTHER PUBLICATIONS

Krebber et al; "Efficient Pattern Matching in Python"; Aachen Institute for Advanced Study in Computational Engineering Science; High-Performance and Automatic Computing Group; RWTH Aachen University; Sep. 29, 2017.

(Continued)

*Primary Examiner* — Cam Linh T Nguyen
(74) *Attorney, Agent, or Firm* — Cesari and McKenna, LLP

(57) ABSTRACT

Systems and methods may generate or modify a pattern, to search text, utilizing a hierarchical structure. The system and method may receive instructions for generating or modifying the pattern. The system and methods may identify or generate a hierarchical structure containing one or more levels each of which includes one or more objects that store values. The system and method may define a pattern by assigning values to the hierarchical structure when the instructions are for generating the pattern; or may modify one or more values in the hierarchical structure when the instructions are for modifying the pattern. The system and method may receive pattern matching instructions. The (Continued)

system and method may identify, based on the pattern matching instructions and utilizing the hierarchical structure, one or more portions of the program that includes the generated or modified pattern and implement one or more pattern matching functions to provide results.

20 Claims, 14 Drawing Sheets

(56) References Cited

U.S. PATENT DOCUMENTS

| | | | | |
|---|---|---|---|---|
| 2011/0213791 | A1* | 9/2011 | Jain | G06F 16/367 707/755 |
| 2015/0293846 | A1* | 10/2015 | Goyal | H04L 63/1425 711/122 |
| 2015/0295889 | A1* | 10/2015 | Goyal | H04L 63/1408 726/11 |
| 2018/0232598 | A1* | 8/2018 | Vann | G06F 40/205 |

OTHER PUBLICATIONS

Nourie et al.; "Regular Expressions and the Java Programming Language"; Published Aug. 2001, Updated Apr. 2002; https://www.oracle.com/technical-resources/articles/java/regex.html.
Larry Wall; "Apocalypse 5: Pattern Matching"; May 18, 2006; https://raku.org/archive/doc/design/apo/A05.html.
Farrell; "How to create a grammar in Perl 6"; Jan. 13, 2015; https://www.perl.com/article/144/2015/1/13/How-to-create-a-grammar-in-Perl-6/.
https://rosie-lang.org/blog/2018/02/25/why-rpl.html; "Why Create a Regex Replacement"; Feb. 25, 2018.
https://github.com/perlpilot/perl6-docs/blob/master/intro/p6-regex-intro.pod; "Introduction to Perl 6 Regex"; Jun. 19, 2018.
Python Software Foundation; "6.2. re—Regular expression operations"; Mar. 17, 2019; https://docs.python.org/release/3.5.7/library/re.html.
Ni et al.; "Four steps to get a quick start with Perl Regular Expressions in SAS®"; PharmaSUG China 2019—Paper CC-073; Everest Clinical Research, Shanghai, China.

* cited by examiner

```
function result = emailAddressPattern                               ─── 105
                                          ─── 101
   identifier = asManyOfPattern(alphanumericsPattern(1) | "_",1); ─── 110
   identifier = maskedPattern(identifier);  ─── 115
       ─── 103      ─── 102
   subdomain  = asManyOfPattern(identifier + ".") + identifier; ─── 120
   domainName = identifier;        ─── 125
                              ─── 130
   tld        = "com" | "gov" | "net";    ─── 135
                                  ─── 104
   localPart  = identifier;
   domain     = optionalPattern(namedPattern(subdomain) + ".") +
                namedPattern(domainName) + "." +                ─┐
                namedPattern(tld);                               ├── 140
       ─── 106                                                  ─┘
            ─── 104
            ─── 104                    ─── 104
   result = namedPattern(localPart) + "@" + namedPattern(domain);
   result = namedPattern(result,"emailAddress");   ─── 150
end ─── 155
```

FIG. 1A

```
emailAddress : localPart + "@" + domain
localPart    : identifier
domain       : optionalPattern(subdomain + ".") + domainName + "." + tld
subdomain    : asManyOfPattern(identifier + ".") + identifier
domainName   : identifier
tld          : "com" | "gov" | "net"
```

FIG. 1B

```
>> mathworksEmailAddress = emailAddressPattern;         ─── 165
>> mathworksEmailAddress.emailAddress.domain = "mathworks.com"  ─── 170 emailAddress: localPart + "@" domain
  localPart : identifier              } ─── 175
  domain    : "mathworks.com"
```

FIG. 1C

```
>> count("Send complaints to jmac@mathworks.com, scopper@mathworks.com, or ─── 180
kstyle@gmail.com", mathworksEmailAddress)

ans =
  2 ─── 185
```

FIG. 1D

```
>> newTLD = emailAddressPattern;
>> newTLD.emailAddress.domain.tld = newTLD.emailAddress.domain.tld | "edu";
```

FIG. 5A

```
emailAddress : localPart + "@" + domain
localPart    : identifier
domain       : optionalPattern(subdomain + ".") + domainName + "." + tld
subdomain    : asManyOfPattern(identifier + ".") + identifier
domainName   : identifier
tld          : "com" | "gov" | "net" | "edu"
```

```
>> contains ("Send complaints to jmac@mathworks.com or tmac@gmail.com.",
mathworksEmailAddress)

ans =
  logicical
    1 ──── 665
```
──── 660

FIG. 6

```
>> replace ("Send complaints to jmac@mathworks.com, scopper@mathworks.com, or
kstyle@gmail.com.", mathworksEmailAddress, "TonyTiger@mathworks.com")
                                                                    ──── 700
ans =
  "Send complaints to TonyTiger@mathworks.com, TonyTiger@mathworks.com, or
kstyle@gmail.com."
                ──── 705
```

FIG. 7

```
>> extract ("Send complaints to jmac@mathworks.com, scopper@mathworks.com, or
kstyle@gmail.com.", mathworksEmailAddress)
                                        ──── 800
ans =
  "jmac@mathworks.com"  ⎫
  "scopper@mathworks.com" ⎬ ──── 805
                          ⎭
```

FIG. 8A

```
>> [~, result] = extract("Contact us at 1ASupporters@mathworks.com", emailAddressPattern) ─810 emailAddress  : "1ASupporters@mathworks.com"  ⎫
  localPart   : "1ASupporters"                 ⎬
  domain      : "mathworks.com"                ⎭ ─815
    subdomain : []
    domainName: "mathworks"
    tld       : "com"
```

FIG. 8B

```
>>myPattern = emailAddressPattern
>>myPattern.emailAddress.domain optionalPattern(subdomain + ".") + domainName + "." + tld Using subpatterns:

subdomain  : asManyOfPattern(identifier + ".") + identifier
    domainName: identifier
    tld        : "com" | "gov" | "net"
```

FIG. 9A

```
>> newDomain = emailAddressPattern;

>> newDomain = selectPattern(newDomain, "emailAddress.domain");

>> replace("Send complaints to jmac@mathworks.com or scopper@mathworks.com or visit
mathworks.com.", newDomain, "geocities.com")

ans =
"Send complaints to jmac@geocities.com or scopper@geocities.com or visit
    mathworks.com"
```

FIG. 9B

SYSTEMS AND METHODS FOR GENERATING AND MODIFYING A PATTERN FOR PATTERN MATCHING UTILIZING A HIERARCHICAL STRUCTURE THAT STORES ONE OR MORE VALUES

BRIEF DESCRIPTION OF THE DRAWINGS

The description below refers to the accompanying drawings, of which:

FIG. 1A is an illustration of example pattern generating instructions for generating a pattern in accordance with one or more embodiments described herein;

FIG. 1B is an illustration of an example display of a pattern representation of a pattern that is generated based on the execution of pattern generating instructions of FIG. 1A in accordance with one or more embodiments described herein.

FIG. 1C is an illustration of an example pattern modification instruction that modifies the domain portion of the email address pattern of FIG. 1A to generate a new pattern, and an example display of a pattern representation for the new pattern in accordance with one or more embodiments described herein;

FIG. 1D is an illustration of an example count pattern matching function that determines the number of occurrences a pattern is identified in text being searched in accordance with one or more embodiments described herein;

FIG. 5A is an illustration of an example pattern modification instruction for adding a value to the tld portion of the email address pattern of FIG. 1A in accordance with one or more embodiments described herein;

FIG. 5C is an illustration of an example pattern representation that is generated based on the execution of pattern modification instructions of FIG. 5A in accordance with one or more embodiments described herein;

FIG. 6 is an illustration of an example contains pattern matching function that is used to search for matching patterns within text according to one or more embodiments described herein;

FIG. 7 is an illustration of an example replace pattern matching function that replaces portions of text using the constructed patterns according to one or more embodiments described herein;

FIG. 8A is an illustration of an example extract pattern matching function that extracts from text what the generated or modified pattern matches in the text according to one or more embodiments described herein;

FIG. 8B is an illustration of an example nested capture pattern matching function that extracts and parses a pattern identified in text according to one or more embodiments described herein;

FIG. 9A is an illustration of an example pattern portion selection function that indexes into a pattern and selects a portion of the pattern according to one or more embodiments described herein;

FIG. 9B is an illustration of an example context select pattern function that replaces a portion of a pattern in relation to a match of the entire pattern according to one or more embodiments described herein;

DETAILED DESCRIPTION OF AN ILLUSTRATIVE EMBODIMENT

Figure 2:
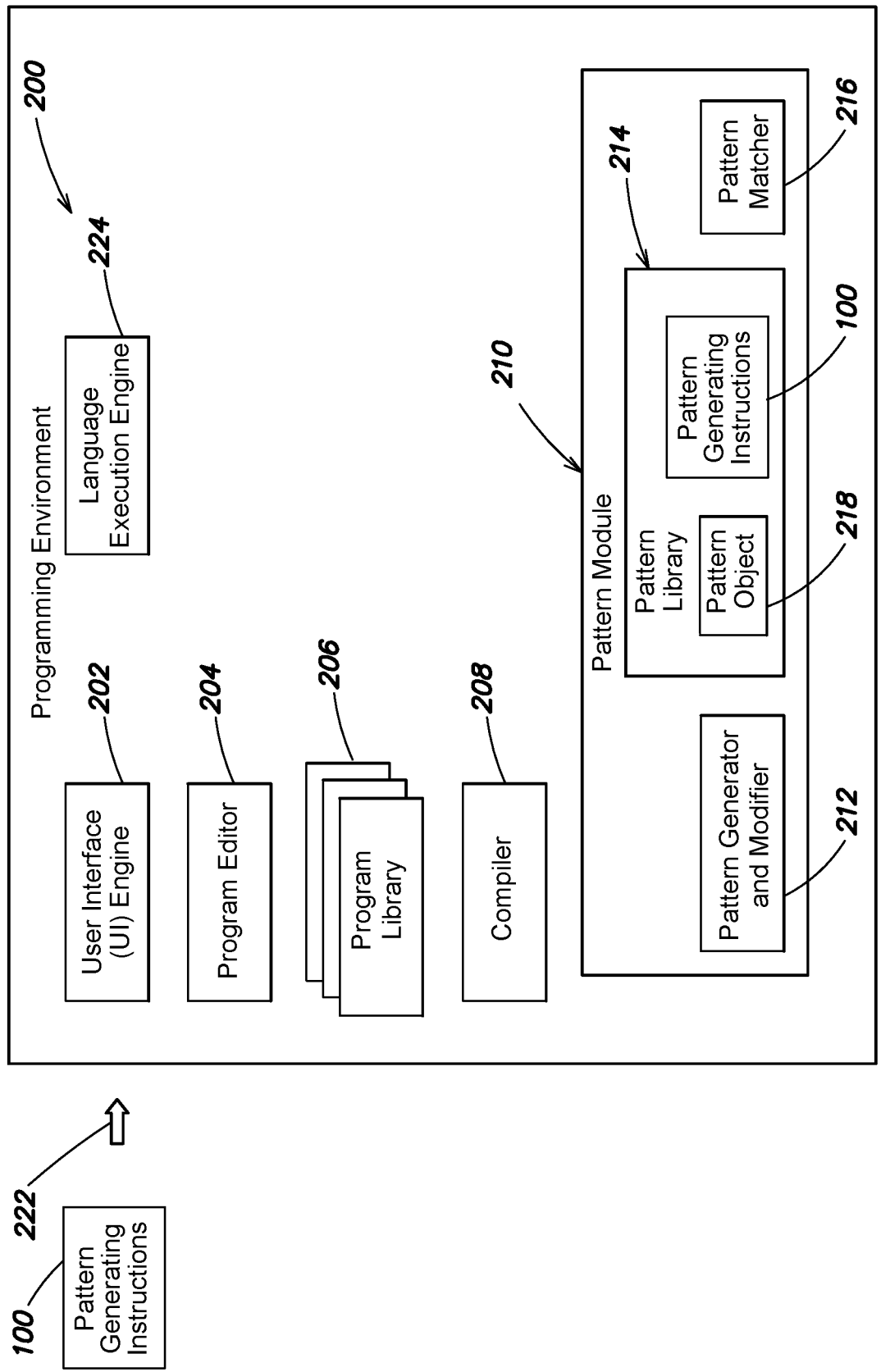
FIG. 2 is a schematic, partial illustration of an example programming environment 200 in accordance with one or more embodiments described herein.

Pattern matching, such as text pattern matching, is a powerful technique for searching a data source, such as a database and/or a file to identify desired patterns within the data source (text). The data source can contain numerical data, characters, strings, special characters, a combination thereof, etc. There are many applications for pattern matching in computer science. High-level language compilers may make use of pattern matching in order to parse source files to determine if they are syntactically correct. In programming languages and applications, pattern matching may be used in identifying the matching pattern or substituting the matching pattern with another token sequence.

Conventional search tools include using a regular expression that is a sequence of characters to define a search pattern. Each character in a regular expression (that is, each character in the string describing its pattern) is either a metacharacter having a special meaning or a literal character that has a literal meaning. Regular expressions may help users, e.g., programmers, match, search, and/or replace text in a program. However, regular expressions use terse syntax which makes it difficult for users to read and write the pattern, as well as understand the patterns that are defined by the regular expressions. In addition, the terse syntax makes it difficult for users to debug the regular expressions.

For example, suppose a user wants to search a program and/or text file for all email addresses. Specifically, all email addresses have a particular format: localpart@subdomain (optional).domain.tld. As such, the following regular expression may be used to define such a pattern for pattern matching:

>>pat="(?<emailAddress>(?<localPart>\w+)@(?<domain>((((?<subdomain>(\w+\.)*\w+))\.)?)
(?<domainName>\w+))\.)(?<tld>com|gov|net)))"

The terse syntax of the above regular expression makes it difficult for a user to read, write, decipher, and understand the pattern being implemented, and how the different characters, e.g., metacharacters and literal characters, relate to each other to implement the pattern. As such, creating and/or modifying the above regular expression to define and/or modify the pattern may be difficult and prone to user error due to the terse syntax of regular expressions. For example, if a user wanted to modify the email address pattern such that only email addresses with the domain "gmail.com" (e.g., localpart@gmail.com) are identified, the above regular expression may be modified in the following manner to define such a pattern for pattern matching:

>>pat="(?<emailAddress>(?<localPart>\w+)
@gmail\.com)"

The above two regular expressions illustrate that the terse syntax of regular expressions makes it difficult to understand, create, debug, and modify patterns; especially as the length of regular expressions increase to, for example, implement more complex patterns.

Other conventional search tools, such as web-based search engines (e.g., Google, Bing, Yahoo, etc.), may allow users to search programs and/or files using a less terse syntax that is easier to understand, but such searches may lack the functionality that may be desired by users. For example, web-based search engines may not allow users easily modify an existing pattern, and then utilize the modified pattern with robust pattern matching functions.

Briefly, the present disclosure relates to systems and methods for generating and modifying a pattern for pattern matching utilizing a hierarchical structure that stores one or more values.

Specifically, a process may receive one or more instructions that contain information for generating or modifying a pattern to be identified in one or more searches of text that may, for example, be created in one or more programing languages. In an embodiment, when the one or more instructions are for generating the pattern, the process may execute the one or more instructions to generate a hierarchical structure. The hierarchical structure may contain a plurality of hierarchical levels each of which may include one or more objects, e.g., nodes, that may store one or more values. The configuration of the hierarchical structure, its objects, and the values stored in the objects may define the pattern and may be based on the information in the one or more instructions for generating the pattern.

In an embodiment, when the one or more instructions are for modifying the pattern, i.e., a previously generated pattern, the process may identify the hierarchical structure of a pattern object that is stored and corresponds to the pattern to be modified. The process may then modify the pattern by utilizing the instructions and performing one or more of modifying a value of one or more objects of the hierarchical structure, removing an existing value from the hierarchical structure, or adding an additional value to the hierarchical structure. In an embodiment, the modification to the hierarchical structure may change the overall configuration of the hierarchical structure, e.g., the modified hierarchical structure may include new objects, different objects, or less objects. The instructions, utilized to modify the pattern, may be in a format associated with a dot indexing schema or a different accessing schema. The process may store the modified pattern in a storage medium. As such, and as a pattern is modified over time, new pattern objects, i.e., patterns, are stored. For example, a pattern object that includes a hierarchical structure may be stored for the previously generated pattern, and a pattern object that includes a hierarchical structure may be stored for the modified pattern. The generated patterns, e.g., hierarchical structures, may be stored, for example, in a pattern library accessible to users to reduce the burden of recreating or generating patterns. In response to a request to display a generated pattern, e.g., by a user utilizing a processing device, a pattern representation may be generated from the hierarchical structure. The pattern representation may be displayed on a display device that provides information regarding the organization and details of the generated pattern. The user may utilize the pattern representation to, for example, determine how the pattern is to be modified to meet the criteria/preferences of the user, such that the modified pattern may be utilized to implement one or more pattern matching functions.

The process may receive one or more pattern matching instructions that contain pattern matching information, wherein the pattern matching information may identify the generated or modified pattern and may also identify one or more pattern matching functions to be implemented to search text. For example, the one or more pattern matching instructions may be in a format that is associated with a dot indexing schema or a different pattern matching schema. The pattern matching functions may include, but are not limited to, a contains pattern matching function that determines whether the generated or modified pattern is identified in the text, a count pattern matching function that determines a number of occurrences the generated or modified pattern is identified in the text, an extract pattern matching function that extracts what the generated or modified pattern matches in the text, a replace pattern matching function that replaces the generated or modified pattern identified in the text with one or more new characters to generate modified data, a pattern portion selection matching function that obtains information about one or more portions of the pattern, etc.

The process may, based on the pattern matching information, identify one or more portions of the text that include the generated or modified pattern and provide result information based on the identifying and based on the type of pattern matching function indicated in the pattern matching instructions.

FIG. 1A is an illustration of example pattern generating instructions 100 for generating a pattern in accordance with one or more embodiments described herein. The pattern generating instructions may be received at an input interface, e.g., a command line interface (CLI), from a user utilizing a processing device. In addition or alternatively, a file or other type of object may store the pattern generating instructions 100 that are pre-defined, and the file or other object may be provided to the user. Based on the execution of the pattern instructions 100, that are provided by the user or included in the file, the one or more embodiments describe herein may generate a hierarchical structure as will be described in further detail below. In this example, pattern generating instructions 100 may be used to generate an email address pattern that is utilized to identify one or more email addresses in text to be searched.

An email address is a concatenation of a local part portion, followed by the "@" symbol, optionally followed by a subdomain, followed by a domain portion, and followed by a top-level domain (tld) e.g., localpart@subdomain(optional).domain.tld. Pattern generating instructions 100 may be utilized to define the different portions (e.g., local part, subdomain (zero, one, or a plurality of subdomains), domain name, and tld) of an email address and their relationship to each other with respect to the overall format/structure of the email address. Thus, the email address pattern that is defined by pattern generating instructions 100 may be utilized to identify consecutive characters, in text being searched, that match the format/structure of an email address. For example, the characters may include numerical data, string characters, special characters, a combination thereof, etc.

Within the instructions 100, instruction 105 defines a function named "emailAddressPattern", where "result" is the name of the variable utilized by the function that has values returned by the function when the function executes.

Pattern generating instructions 100 include different pattern building functions that implement predefined pattern functions. The pattern building functions may be predefined by other users or by authors of the programming environments in which the instructions 100 can be used, e.g., executed. In the example as depicted in FIG. 1A, selected pattern building functions (e.g., alphanumericsPattern 101, asManyOfPattern 102, maskedPattern 103, namedPattern 104, and optionalPattern 106) are utilized to build and generate the email address pattern defined by pattern generating instructions 100. Although FIG. 1A illustrates the use of selected pattern building functions, it is expressly contemplated that other pattern building functions may be utilized to build a pattern according to the one or more embodiments described herein. The following table illustrates a list of example pattern building functions and their associated functionalities.

| Pattern Building Function | Functionality |
| --- | --- |
| digitsPattern | Creates a pattern that matches digit characters |
| lettersPattern | Creates a pattern that matches letter characters |
| alphanumericsPattern | Creates a pattern that matches alphanumeric characters |
| whitespacePattern | Creates a pattern that matches whitespace characters |
| asFewOfPattern | Creates a pattern that matches as few times as possible |
| asManyOfPattern | Creates a pattern that matches as many times as possible |
| optionalPattern | Creates a pattern that may be omitted when matching |
| possessivePattern | Creates a pattern that does not backtrack to complete match |
| caseSensitivePattern | Creates a pattern that matches case sensitively |
| caseInsensitivePattern | Creates a pattern that matches case insensitively |
| characterListPattern | Creates a pattern that matches a character from a list |
| wholeWordPattern | Creates a pattern that is bounded by word anchors |
| wholeLinePattern | Creates a pattern that is bounded by line anchors |
| wholeTextPattern | Creates a pattern that is bounded by text anchors |
| wildcardPattern | Creates a pattern that matches as few of any characters |
| lineAnchor | Creates a pattern that matches the beginning or end of a line |
| textAnchor | Creates a pattern that matches the beginning or end of text |
| wordAnchor | Creates a pattern that matches the beginning or end of a word |
| lookAheadAnchor | Creates a pattern that looks ahead for a match |
| lookBehindAnchor | Creates a pattern that looks behind for a match |
| maskPattern | Creates a pattern with a custom display |
| namedPattern | Creates a pattern with a named subpattern |
| regexpPattern | Creates a pattern that matches a regular expression |

Although the table above include pattern building functions with particular names, it is expressly contemplated that the pattern building functions may have any names to implement the corresponding functionalities included in the table. In addition, it is expressly contemplated that table 1 is not meant to be exhaustive, and other pattern building functions not included in the table above may be utilized to build a pattern in accordance with one or more embodiments described herein. The functionalities, for example, may be pre-defined by other users or by authors of the programming environments in which the instructions 100 can be used, e.g., executed.

Returning to the example of FIG. 1A, the alphanumericsPattern building function 101 utilized in instruction 110 may generate a pattern that will search for and identify (i.e., match) specified, e.g., through argument value(s), alphanumeric character(s) in text being searched. In this example, a "1" is provided as the argument value, e.g., alphanumericsPattern(1). As such, the generated pattern of alphanumericsPattern(1) 101 searches for and identifies all instances of a single alphanumeric character in the text being searched. Had a "2" been included, the generated pattern of alphanumericsPattern(2) would search for and identify all instances of two consecutive alphanumeric characters in the text being searched. The "|" is a symbol that represents an "or" operation and the "_" may be an indication of a literal underscore. As such, alphanumericsPattern(1)|"_" of instruction 110 may generate a pattern that searches for and identifies all instances of either a single alphanumeric character or an underscore in text being searched.

In addition, instruction 110 includes the asManyOfPattern (Pat, min) building function 102. The asManyOfPattern(Pat, min) building function may generate a pattern that will search for and identify all instances where the indicated pattern appears consecutively in text being searched, where "Pat" is the indicated pattern and "min" is the minimum number of times the indicated pattern is required to be identified consecutively within text being searched. In this example, instruction 110 includes asManyOfPattern(alphanumericsPattern(1)|"_", 1). Placing alphanumericsPattern (1)|"_" within the asManyOfPattern building function 102 may generate a pattern that searches for and identifies all instances of a string, of at least a length of 1, of consecutive alphanumeric characters and/or underscores in text being searched. For example, if text includes "abc3_4.1*$55cde", the generated pattern may identify abc3_4, 1, and 55cde from the text. If instruction 110 included asManyOfPattern (alphanumericsPattern(1)|"_", 2), the generated pattern may search for and identify all instances of a string, of at least a length of 2, of consecutive alphanumeric characters and/or underscores in the text being searched. Following the example above, the generated pattern would identify abc3_4 and 55cde from the text. In instruction 110, "identifier" is the name of a created variable that stores the generated pattern.

Instruction 115 includes the maskedPattern(Pat) building function 103. The maskedPattern(Pat) building function 103 may be utilized to hide the specifics and particularities of the generated pattern such that the generated pattern can be referenced by a simpler construct, e.g., variable. "Pat" is the indicated pattern that is to be masked. In this example, "identifier", which is the variable that stores the pattern generated in instruction 110, is being masked. Because the variable named identifier stores the mask of the generated pattern in instruction 115, "identifier" may be used to reference the generated pattern. Therefore, whenever the generated pattern is subsequently displayed, for example, "identifier" may be utilized instead of asManyOfPattern(alphanumericsPattern(1)|"_",1).

Instructions 110 and 115 therefore together create a variable named identifier that stores a pattern that searches for and identifies in text being searched all instances of a string, of at least a length of 1, of consecutive alphanumeric characters and/or underscores, where "identifier" may be utilized to reference the pattern.

Instruction 120 utilizes the asManyOfPattern building function 102. Instruction 120 creates a variable named subdomain that stores a pattern that defines the subdomain portion of an email address. The "+" is a concatenation symbol that represents a "followed by" operation, meaning that the pattern before the "+" must match and be followed by a match of the pattern after the "+" (hereinafter referred to as "pattern concatenation). As such, asManyOfPattern (identifier+".")+identifier of instruction 120 defines the subdomain portion of an email address as a pattern that includes zero or more instances of identifier (i.e., a string, of at least a length of 1, of consecutive alphanumeric characters and/or underscores) followed by a period, that is then followed by a single instance of identifier (i.e., a string, of at least a length of 1, of consecutive alphanumeric characters and/or underscores). The pattern stored in the variable named subdomain ensures that the subdomain portion of an email address, if it exists in an email address, includes at least one identifier (i.e., a string, of at least a length of 1, of consecutive alphanumeric characters and/or underscores). Had instruction 120 included a "1", instruction 120 would define the subdomain portion of an email address, if it exists in an email address, as a pattern that includes one or more instances of identifier followed by a period, that is then followed by a single instance of identifier.

Instruction 125 creates a variable named domainName that stores a pattern that defines the domain name portion of an email address. Specifically, instruction 125 defines the domain name portion of an email address as a pattern, i.e., identifier, that includes a string, of at least a length of 1, of consecutive alphanumeric characters and/or underscores. Instruction 130 creates a variable named tld that stores identifiers that define the tld portion of an email address. Specifically, instruction 130 defines the tld portion of an email address as including either "com, "gov", or "net." Further, instruction 135 creates a variable named localPart that stores a pattern that defines the local part portion of an email address. Specifically, instruction 135 defines the local part portion of an email address as a pattern, i.e., identifier, that includes a string, of at least a length of 1, of consecutive alphanumeric characters and/or underscores.

Instruction 140 utilizes the namedPattern building function 104. The namedPattern building function 104 may allow for created patterns to be structured in a named pattern hierarchy based on the composition of namedPattern patterns as will be described in further detail below. When a pattern is named utilizing the namedPattern building function 104, that pattern may be accessed via a dot indexing schema or a different accessing schema to, for example, modify/customize the pattern as will be described in further detail below. In this example, the namedPattern building function 104 is utilized in instruction 140 to create a named pattern subdomain, a named pattern domainName, and a named pattern tld. As each named pattern references a variable with the same name, each named pattern is created utilizing the pattern stored in the variable with the same name and previously defined in pattern generating instructions 100. For example, the named pattern subdomain is created utilizing the pattern stored in the variable named subdomain, and uses the name of the variable as the name of the pattern. Similarly, named patterns domainName and tld are respectively created utilizing the patterns stored in the variables named domainName and tld, and respectively use the name of the variable as the name of the pattern.

Since an email address may or may not include a subdomain, i.e., it is optional, the optionalPattern building function 106 may be utilized with the named pattern subdomain to indicate that a subdomain is not required when identifying an email address in text being searched. Since a subdomain portion, when included in an email address, is always separated from the domain name portion of the email address by a period, the pattern concatenation and "." are provided as argument values of the optionalPattern building function 106 with namedPattern (subdomain).

Thus, instruction 140 creates a variable named domain that defines the entire domain portion of an email address (e.g., everything that follows the "@" symbol in an email address). Specifically, the domain portion of an email address is a combination of one or more subdomains that are followed by a period (that are optional), the domain name, a period, and the tld in that order. As such, the variable named domain stores a pattern that is a concatenation of the named pattern subdomain (that is optional), named pattern domainName, a period, and named pattern tld in that order, where each of the named patterns store a pattern based on the previously created variable that defines the portion of an email address.

Instruction 145 creates a named pattern localPart for the local part portion of the email address. Since the named pattern localPart references a variable with the same name (e.g., reference variable named localPart), the named pattern localPart is created utilizing the pattern stored in the variable named localPart. In addition, instruction 145 creates a named pattern domain for the domain portion of the email address. Since the named pattern domain references a variable with the same name (e.g., variable named domain), the named pattern domain is created utilizing the pattern stored in variable named domain of instruction 140.

An email address is a concatenation of a local part portion, followed by the "@" symbol, and then followed by a domain portion. As such, the variable named result of instruction 145 stores a pattern concatenation of the named pattern localPart, the "@" symbol, and the named pattern domain in that order, where each named pattern stores a pattern based on the previously created variable that defines the portion of the email address.

Since the named pattern localPart and the named pattern domain are concatenated together, when executed to generate the email address pattern, the named pattern localPart and named pattern domain are determined, e.g., by the methods and systems described herein, to be on the same hierarchical level of the named pattern hierarchy. However, because the named pattern domain references the variable named domain that stores named patterns subdomain, domainName, and tld, the named pattern domain is determined to be at a higher hierarchical level of the named pattern hierarchy than the named patterns subdomain, domainName, and tld. Because the named patterns subdomain, domainName, and tld are concatenated together, named patterns subdomain, domainName, and tld are determined to be on the same hierarchical level of the named pattern hierarchy. If, for example, the named patterns subdomain, domainName, and tld were grouped together utilizing the "|" symbol instead of being concatenated together, the named patterns subdomain, domainName, and tld would still be determined to be on the same hierarchical level of the named pattern hierarchy.

Instruction 150 utilizes the namedPattern 104 building function to create a named pattern based on the variable named result that stores a pattern that is a concatenation of the named pattern localPart, the "@" symbol, and named pattern domain. Since "emailAddress" follows "result" provided in the argument values, the created namedPattern is named emailAddress and stored in the variable named results as depicted in instruction 150. Had "emailAddress" not followed "result" in the argument values, the named pattern would have been named "result." Since the named pattern emailAddress makes reference to the variable named result that stores named patterns localPart and domain, named pattern emailAddress is at a higher hierarchical level than named patterns localPart and domain in the named pattern hierarchy. As such, in this example, named pattern emailAddress is at a top hierarchical level of the named pattern hierarchy and named patterns localPart and domain are at a next hierarchical level of the named pattern hierarchy. In addition, named patterns subdomain, domainName, and tld are at a bottom level of the named pattern hierarchy and associated with named pattern domain since named patterns subdomain, domainName, and tld are referenced by named pattern domain and are not referenced by named pattern localPart.

Instruction 155 is an "end" identifier that is utilized to end the function named emailAddressPattern. Therefore, and based on the execution of pattern generation instructions, the email address pattern may be generated to identify consecutive characters, in text being searched, that match the format/structure of an email address.

When pattern generating instructions 100 are executed, a hierarchical structure, that will be described in further detail below, may be generated. For example, a user may enter the function name, e.g., emailAddressPattern, at a command line interface (CLI) of a processing device to execute pattern generating instructions 100 to generate a hierarchical structure for the email address pattern of FIG. 1A. Advantageously, patterns may be created, by, for example, a user utilizing pattern building functions that are easy to read, write, decipher, and understand as illustrated above with reference to the email address pattern generated from the execution of instructions 100.

Upon user request, a pattern representation of the generated pattern may, for example, be presented to a user on a display to provide information regarding the organization and details of the generated pattern. FIG. 1B is an illustration of an example display of a pattern representation 160 that represents the pattern generated based on the execution of pattern generating instructions 100 in accordance with one or more embodiments described herein. In an embodiment, pattern representation 160 may, for example, be displayed on a display device of a processing device. For example, and based on a request at a CLI of a processing device from a user, the one or more embodiments described herein may display pattern representation 160 on a display of the processing device.

Pattern representation 160 may include each of the named patterns included in the pattern generating instructions 100, and may further include the details associated with each named pattern. Specifically, and as depicted in FIG. 1B, pattern representation 160 includes each of the named patterns (emailAddress, localPart, domain, subdomain, domainName, and tld) created in pattern generating instructions 100 of FIG. 1A. In addition, the named patterns may be organized, on a display device for example, based on the named pattern hierarchy. Specifically, and as depicted in FIG. 1B, named pattern emailAddress is indented a first amount in pattern representation 160 since named pattern emailAddress is at the top level of the named pattern hierarchy. In addition, named patterns localPart and domain are indented a second amount in pattern representation 160 since named patterns localPart and domain are at the next level of the named pattern hierarchy. Further, named patterns subdomain, domainName, and tld are indented a third amount in pattern representation 160 since they are at the bottom level of the named pattern hierarchy. Moreover, because named patterns subdomain, domainName, and tld are referred to by the named pattern domain and are not referred to by the named pattern localPart, named patterns subdomain, domainName, and tld may be positioned in pattern representation 160 under "domain" in FIG. 1B. Advantageously, and when pattern representation 160 is, for example, displayed on a display device, a user may view and understand the named pattern hierarchy and how the different named patterns relate to each other for the generated pattern.

Although pattern representation 160 of FIG. 1B utilizes different indenting to differentiate between named patterns at different hierarchical levels in the named pattern hierarchy, it is expressly contemplated that any of a variety of different techniques may be utilized to differentiate between named patterns at different hierarchical levels in the named pattern hierarchy that may be easy for the user to understand. For example, colorings, markings, shading, or any other type of indicators may be utilized to differentiate between named patterns at different hierarchical levels in the named pattern hierarchy.

In addition, pattern representation 160 may include the details associated with each created name patterns as depicted in FIG. 1B. For example, pattern representation 160 includes named pattern emailAddress, followed by a ":", that is then followed by the details associated with the named pattern emailAddress. Specifically, the details indicate that the named pattern emailAddress is a concatenation of named pattern localPart, followed by the "@" symbol, and then followed by named pattern domain as created in pattern generating instructions 100. Similarly, pattern representation 160 includes the details for each of the other named patterns as created in pattern generating instructions 100.

The named patterns, as depicted in pattern representation 160 of FIG. 1B, may be patterns and/or sub-patterns. For example, because named pattern emailAddress is in the top level of the named pattern hierarchy, named pattern emailAddress may be referred to as a pattern. However, because named patterns localPart and domain are in the next level of the named pattern hierarchy, named patterns localPart and domain may be referred to as patterns and/or sub-patterns, i.e., children, of named pattern emailAddress. Similarly, because named patterns subdomain, domainName, and tld are in the bottom level of the named pattern hierarchy, named patterns subdomain, domainName, and tld may be referred to as patterns, sub-patterns of named pattern domain, and/or sub-patterns of named pattern emailAddress.

Advantageously, and when displayed, pattern representation 160 provides to a user an organized depiction of the pattern. Specifically, pattern representation 160 may depict each of the named patterns in the named pattern hierarchy that makes up the pattern, the relationships among the named patterns in the pattern hierarchy, and the values stored for each named pattern in the named pattern hierarchy. Therefore, and by viewing pattern representation 160, the user may be able to obtain a clear understanding of the particulars of the pattern and how the pattern is implemented, such that, for example, the user can modify the pattern and implement different pattern matching functions as will be described in further detail below. With conventional techniques, such as a regular expression used for pattern matching, such information, e.g., relationships and details, might not be provided to a user or easily deciphered/gleaned by the user, and the user instead may have to carefully and deliberately analyze the terse syntax of regular expressions to understand the pattern, which can be arduous and time consuming. As such, the generation and presentation of pattern representation 160 provides an improvement in the technological field of computer-based pattern matching.

After the pattern is generated it may be modified, i.e., customized, by the same user who created the pattern 160 or by a different user. For example, a user may wish to modify a pattern such that different variations of the original pattern, i.e., previously generated pattern, may be identified in text being searched.

Advantageously, the user does not have to create, for example, a new pattern, and instead can simply modify the existing pattern to customize the pattern based on the user's preferences. That is, the original pattern need only be created once, and then a plurality of different users can modify that original pattern in different ways based on different user preferences. For example, the email address pattern of FIG. 1A may be created a single time, and a plurality of different users may receive and modify the pattern in different ways to generate different email address patterns.

FIG. 1C is an illustration of an example pattern modification instruction 170 that modifies the domain portion of the email address pattern of FIG. 1A to generate a new pattern, and an example display for a pattern representation for the new pattern. Specifically, the pattern modification instruction 170 of FIG. 1C modifies the email address pattern from any email address to an email address that includes the domain of "mathworks" and the tld of ".com", e.g., "mathworks.com."

Instruction 165 may be input at a CLI of a processing device. Instruction 165 may create a variable named mathworksEmailAddress that stores an instance of the email address pattern generated based on the execution of pattern generating instructions 100. As such, and when the email address pattern stored in the variable named mathworksEmailAddress is modified/customized, the original email address pattern that was generated based on the execution of pattern generating instructions 100 is not overwritten. In this example, a user may want to modify the domain portion of the email address pattern. Specifically, and based on the execution of pattern generating instructions 100, the domain portion of the email address pattern is defined as a combination of one or more subdomains followed by a period (that are optional), followed by the domain name, followed by a period, and followed by the tld. The user in this example may want to modify the domain portion of the email address pattern to a specific domain and tld, and particularly to mathworks.com.

As such, the user may index, utilizing pattern modification instruction 170, into the domain portion of the email address pattern stored in the variable named mathworksEmailAddress to modify the domain portion. Pattern modification instruction 170 may be input at a CLI of a processing device. In addition, pattern modification instruction 170 may be associated with a dot indexing schema or a different accessing schema. Because the domain portion is to be modified, each named pattern in the named pattern hierarchy from named pattern domain to the top named pattern, emailAddress, is to be included in pattern modification instruction 170 to modify the domain portion of the email address pattern. Specifically, pattern modification instruction 170 recites "mathworksEmailAddress.emailAddress.domain" to index into the domain portion of the email address pattern stored in the variable named mathworksEmailAddress. Pattern modification instruction 170 identifies the variable (e.g., mathworksEmailAddress) that stores the pattern to be modified, followed by a period, followed by the top named pattern (e.g., emailAddress) in the named pattern hierarchy, followed by a period, and then followed by the named pattern (e.g., domain) in the second level of the named pattern hierarchy that is to be modified. If, for example, the subdomain was to be modified, the pattern modification instruction to modify the subdomain may be "mathworksEmailAddress.emailAddress.domain.subdomain."

Pattern modification instruction 170 also includes "="mathworks.com"". This portion of pattern modification instruction 170 assigns "mathworks.com" as a value to the named pattern domain of the email address pattern stored in the variable named mathworksEmailAddress. Thus, pattern modification instruction 170 removes the existing values (e.g., references to named pattern subdomain followed by a period (optional), followed by named pattern domainName, followed by a period, followed by named pattern tld) from named pattern domain and replaces the removed values with the value of "mathworks.com".

Advantageously, a user may use a simple and user intuitive instruction, e.g., an instruction associated with a dot indexing schema, to modify/customize a pattern. For example, a user may first understand the pattern and the different values assigned to each named pattern in the named pattern hierarchy based on the display of pattern representation 160. The user may determine, based on the analysis of pattern representation 160, that one or more values of the pattern should be modified (e.g., generic domain changed to "mathworks.com") such that the pattern meets the needs/criteria of the user. Therefore, the user may utilize a simple and user intuitive command, e.g., pattern modification instruction 170, to modify a value associated with the pattern to customize the pattern. With conventional techniques, such as a regular expression for pattern matching, a user would have to analyze the terse syntax of the regular expression to understand the pattern, and then modify particular characters in, for example, a long string of characters.

For example, and as explained above, to modify the domain of the email address pattern created with a regular expression, a user would have to alter the regular expression from pat=

"(?<emailAddress>(?<localPart>\w+)@(?<domain>
((((((?<subdomain>(\w+\.)*\w+))\.)?)
(?<domainName>\w+))\.)(?<tld>com|gov|net)))"

Such a modification requires the user to understand the terse syntax of regular expressions. In addition, such types of modifications are more prone to user error and more difficult to debug due to the terse syntax. Thus, the pattern modification instructions as described herein allow for the modification of a pattern to be performed more easily and user intuitively than, for example, using a regular expression. As such, the one or more embodiments described herein provided an improvement in the technological field of computer-based pattern matching.

Pattern representation 175 is associated with the modified email address pattern that is modified based on execution of instruction 165 and pattern modification instruction 170. As depicted in FIG. 1C, pattern representation 175 includes each of the named patterns included in the modified email address pattern (e.g., named patterns emailAddress, localPart, and domain), where each named pattern is indented a selected amount based on which level, in the named pattern hierarchy, the named pattern is included. In addition, the details associated with each named pattern is included in pattern representation 175. Because only the domain portion of the email address pattern stored in the variable named mathworksEmailAddress was modified, named patterns emailAddress and localPart and their details are the same in pattern representations 160 and 175. However, because the domain portion was modified to "mathworks.com", the details of named pattern domain in pattern representation 175 indicate "mathworks.com". As such, pattern representation 175 does not include references to named patterns subdomain, domainName, and tld and their details, which are included in pattern representation 160.

FIG. 1D is an illustration of an example count pattern matching function that determines the number of occurrences a pattern is identified in text being searched. Pattern matching instruction 180 is an example count pattern matching. To implement the count pattern matching function, the count(text, Pat) pattern matching function may be utilized, where text is the text to be searched and Pat is the pattern that is to be used to search the data source. In this example, the text of pattern matching instruction 180 is "Send complaints to jmac@mathworks.com, scopper@mathworks.com, or kstyle@gmail.com", mathworksEmailAddress. Therefore, the email address pattern stored in the variable named mathworksEmailAddress and generated based on the execution of instruction 165 is used to search the text. Although pattern matching instruction 180 includes the actual text being searched, it is expressly contemplated that pattern matching instruction 180 may store a name of one or more stored files or objects that are to be searched.

Based on the execution of pattern matching instruction 180, a counter may be incremented each time the modified email address pattern matches one or more consecutive characters of the text. As such, the final value of the counter may indicate the total number of occurrences the modified email address pattern is identified within the text. In this example, there are two occurrences (e.g., jmac@mathworks.com and scopper@mathworks.com) of the modified email address pattern, e.g., localPart@mathworks.com, within the text. As such, output 185 is 2 based on the execution of pattern matching instruction 180. Output 185 may, for example, be displayed on a display device. It is noted that if the emailAddress pattern of FIG. 1A was searched with the text, the output would be 3, e.g., jmac@mathworks.com, scopper@mathworks.com, and kstyle@gmail.com that would match localPart@domainName.tld. Advantageously, a user may use a simply and intuitive command, e.g., pattern matching instruction 180, to search text utilizing a preconstructed or modified pattern according to the one or more embodiments described herein. For example, the user may first view the pattern representation 175 of the modified email address pattern to easily understand and decipher the pattern, which, for example, cannot be done with conventional techniques due to the terse syntax of regular expressions. The user can then, based on the understood pattern, utilize a simple and intuitive command, such as pattern instruction 180, to easily search text.

FIG. 2 is a schematic, partial illustration of an example programming environment in accordance with one or more embodiments described herein. The programming environment 200 may include a User Interface (UI) engine 202, a model editor 204, a program library 206, a compiler 208, a language execution engine 224, and a pattern module 210. The UI engine 202 may create and present one or more User Interfaces (UIs), such as CLIs and/or Graphical User Interfaces (GUIs), on the display of a workstation, laptop, tablet, or other data processing device. The CLIs and GUIs may provide a user interface to the programming environment 200, such as a program editing window. Other CLIs and GUIs may be generated as user interfaces to the pattern module 210. The program library 206 may contain one or more programs to be searched according to the one or more embodiments described herein. Some of the programs contained in the program library 206 may come preloaded with the program environment 200, while others may be custom created and saved in the library 206, e.g., by a user. A user may select a program from the program library 206, and the program editor 204 may add instances of the selected program to other programs, may display the program on the display device, may execute the program, and/or may load the program such that the program may be searched according to the one or more embodiments described herein. In addition, the compiler 208 may, for example, compile the programs generated utilizing program editor 204 and/or programs stored in program library 206. The program editor 204 may also perform selected operations on a program, such as open, create, edit, and save, in response to user inputs or programmatically. The language execution engine may run or execute pattern generating instructions, e.g., pattern generating instructions 100, to generate a pattern according to one or more embodiments described herein.

The pattern module 210 may include pattern generator and modifier 212, pattern library 214, and pattern matcher 216. The pattern generator and modifier 212 may generate a pattern object 218, i.e., pattern, and modify a pattern according to the one or more embodiments described herein. For example, the pattern generator and modifier 212 may generate the pattern representations 160 and 175. Further, and as will be described in further detail below, the pattern generator and modifier 212 may generate a hierarchical structure based on the execution of pattern generating instructions. Although FIG. 2 depicts pattern generator and modifier 212 being separate and distinct from compiler 208 and language execution engine 224, it is expressly contemplated that pattern generator and modifier 212 may be part of compiler 208 or language execution engine 224.

Pattern library 214 may store pattern generating instructions, e.g., pattern generating instructions 100, that are utilized to generate one or more pattern objects 218, according to one or more embodiments described herein. In addition, pattern library 214 may store pattern objects 218 for one or more generated and/or modified patterns, according to the one or more embodiments described herein. For example, the programming environment 200 may access the pattern generating instructions 100, e.g., from a computer memory or transmitted from a local or remote device, etc., as indicated by arrow 222, which may then be utilized to generate pattern object 218. Although FIG. 2 depicts pattern library 214 being separate and distinct from pattern library 206, it is expressly contemplated that pattern library 215 may be part of program library 206.

Pattern matcher 216 may implement one or more pattern matching functions according to the one or more embodiments described herein. For example, pattern matcher 216 may execute the count pattern matching function of pattern matching instruction 180 to determine the total number of occurrences a pattern is identified in a program. More specifically, the pattern matcher 216 may translate a hierarchical structure, corresponding to a generated or modified pattern, to a translated data structure (e.g., finite state machine) that is utilized to determine the total number of occurrences a pattern is identified in a program. It is expressly contemplated that pattern matcher 216 may, for example, be a new or existing search engine (not shown) associated with programming environment 200. Alternatively, an existing search engine of the programming environment may be modified to include the functionality of the pattern matcher 216.

In some embodiments, the program environment 200 and/or the pattern module 210 may be implemented through one or more software modules or libraries containing program instructions that perform the methods described herein, among other methods. The software modules may be stored in one or more memories, such as a main memory, a persistent memory, and/or a computer readable media, of a data processing device, and may be executed by one or more processors. Other computer readable media may also be used to store and execute these program instructions, such as one or more non-transitory computer readable media, including optical, magnetic, or magneto-optical media. In other embodiments, one or more of the program environment 200 and/or the pattern module 210 may be implemented in hardware, for example through hardware registers and combinational logic configured and arranged to produce sequential logic circuits that implement the methods described herein. In other embodiments, various combinations of software and hardware, including firmware, may be utilized to implement the systems and methods of the present disclosure.

FIG. 2 is for illustrative purposes only and the present disclosure may be implemented in other ways. For example, in some embodiments, the pattern generator and modifier 212, pattern library 214, and/or pattern matcher 216 may be separate and distinct from the pattern module 210.

Figure 3:
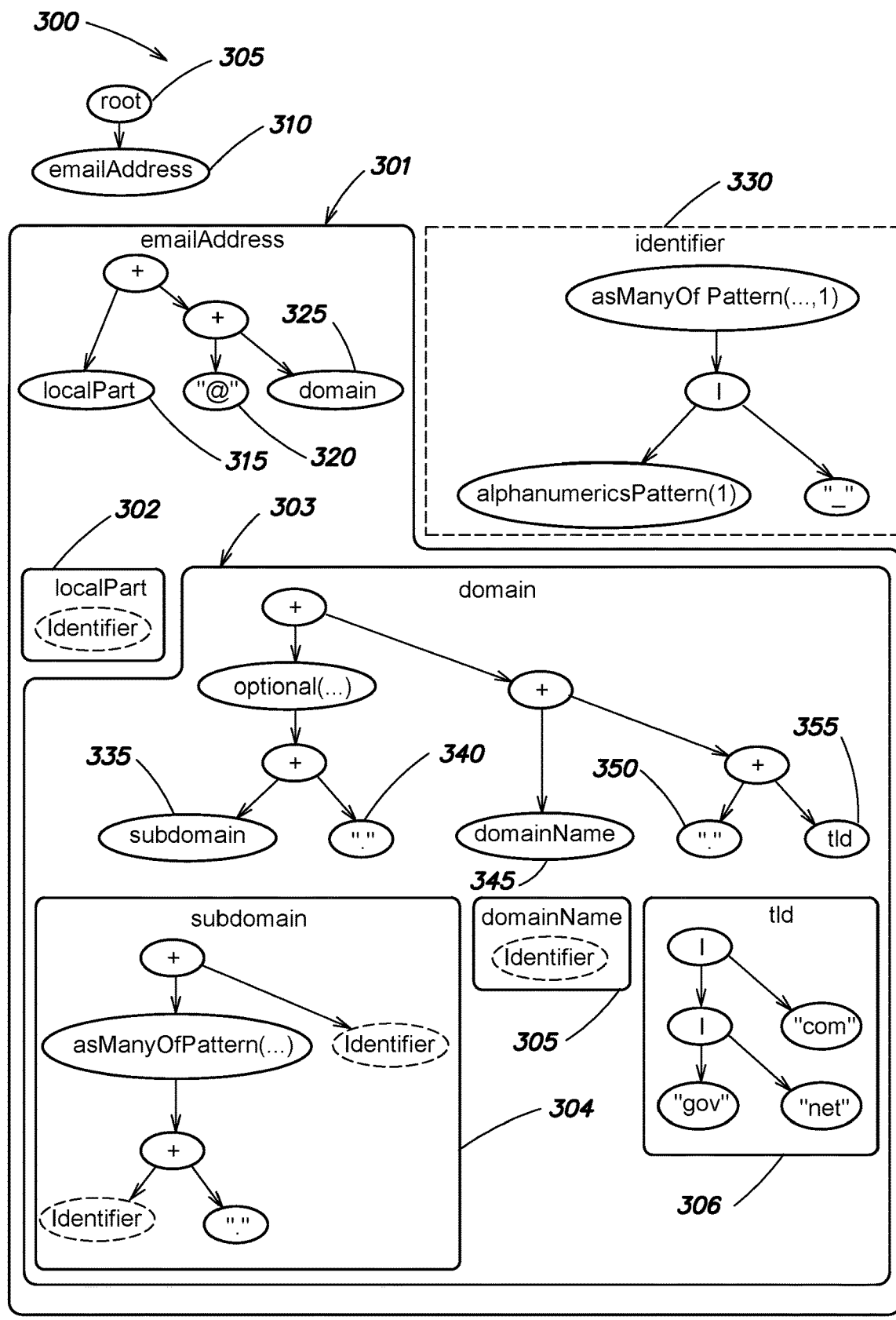
FIG. 3 is an illustration of an example hierarchical structure that is generated based on the execution of pattern generating instructions of FIG. 1A in accordance with one or more embodiments described herein.

FIG. 3 is an illustration of an example hierarchical structure 300 that is generated based on the execution of pattern generating instructions 100 in accordance with one or more embodiments described herein. Although the hierarchical structure 300 is shown in the form of a graph in FIG. 3 for illustration purposes, the structure 300 can be stored, e.g., in pattern library 214, in the form of a file or other data structure, that can be human readable or non-human readable (e.g., only machine readable). Specifically, and when pattern generating instructions 100 are executed, the pattern generator and modifier 212 may generate hierarchical structure 300 for the email address pattern that includes one or more objects that store values. Specifically, and based on the named patterns, variable names/identifiers, and values in pattern generating instructions 100, the pattern generator and modifier 212 may generate objects for hierarchical structure 300 that store particular values for the email address pattern.

In an embodiment, hierarchical structure 300 is shown as a hierarchical tree that includes at least two levels storing one or more objects. Each object, i.e., node, may store one or more values. For example, the one or more values may include, but are not limited to, patterns/references to patterns, objects/references to objects, one or more literal characters, etc. In this example, the pattern generator and modifier 212 generates, for hierarchical structure 300, an object for named patterns emailAddress, localPart, domain, subdomain, domainName, and tld based on the email address pattern as defined in pattern generating instructions 100.

In the example shown in FIG. 3, the hierarchical structure 300 includes substructures for the named patterns: emailAddress substructure 301 that defines the overall email address pattern; localPart substructure 302, domain substructure 303 and identifier substructure 330 for defining various parts of the emailAddress substructure 301; and subdomain substructure 304, domainName substructure 305, and tld substructure 306 for defining various parts of the domain substructure 303. Within the hierarchy 300, the top level includes object 310 for the emailAddress pattern. The next level, e.g., child of the top level, includes objects 315 for the localPart pattern, object 320 for the literal character "@", and object 325 for the domain pattern. The bottom level includes object 335 for the subdomain pattern, object 240 for the literal character ".", object 345 for the domainName pattern, object 350 for the literal character ".", and object 355 for the tld pattern.

In addition, the objects that correspond to the named patterns of the email address pattern may be organized in hierarchical structure 300 based on the named pattern hierarchy. A root 305 of hierarchical structure 300 references object 310, at the top level of hierarchical structure 300, that stores a reference to the named pattern emailAddress. As shown in the emailAddress substructure 301, the named pattern emailAddress stores references to: object 315 that references the named pattern localPart, object 320 that stores the literal character "@", and object 325 that references named pattern domain.

Named pattern localPart and named pattern domain are at the same hierarchical level of the named pattern hierarchy. Therefore, named pattern localPart and named pattern domain are at the same level of hierarchical structure 300.

As shown in localPart substructure 302, named pattern localPart stores a reference to object 330 that stores the pattern that searches for and identifies all instances of a string, of at least a length of 1, of consecutive alphanumeric characters and/or underscores in the text being searched.

As shown in domain substructure 303, named pattern domain stores values that define the domain portion of the email address pattern. Specifically, named pattern domain stores references to: object 335 that references named pattern subdomain, object 340 that stores the literally character ".", object 345 that references named pattern domainName, object 350 that stores the literal character ".", and object 355 that references named pattern tld.

Since the named patterns subdomain, domainName, and tld are at the same level of the named pattern hierarchy, objects 335, 345, and 355 are at the same level of the hierarchical structure 300. As shown in subdomain substructure 304, domainName substructure 305, and tld substructure 306, objects 335, 345, and 355, store values that respectively define the subdomain, domainName, and tld portions of the email address pattern Therefore, the objects of hierarchical structure 300, which store particular values, are structured/organized from top to bottom by the pattern generator and modifier 212 based on the named pattern hierarchy that defines the relationships between the named patterns. That is, the organization of the objects of hierarchical structure 300 may correspond to the organization of the named patterns as created in pattern generating instructions 100. In addition, the organization of the named patterns in hierarchical structure 300 may correspond to the organization of the named patterns in pattern representation 160. Specifically, the object 310 that is at the top hierarchical level of hierarchical structure 300 corresponds to the named pattern emailAddress in pattern representation 160. In addition, the object 315 and the object 325 are at the hierarchical level that is child to the parent level of the object 310 of hierarchical structure 300. The objects 315, 325 respectively correspond to the named patterns localPart and domain in pattern representation 160. Further, object 335, object 345, and object 355 are at the hierarchical level that is child to the parent level of objects 315, 325 of hierarchical structure 300. The objects 335, 345, 355 respectively correspond to named patterns subdomain, domainName, and tld in pattern representation 160. In an embodiment, the pattern representation 160 may be generated based on the hierarchical structure 300. Specifically, the pattern generator and modifier 212 may determine the hierarchy of the named patterns based on an analysis of the hierarchical structure 300, and may then generate the pattern representation 160 based on the analysis.

In an embodiment, the pattern generator and modifier 212 may store hierarchical structure 300 in a pattern object 218 that is stored in pattern library 214. Alternatively, the pattern generator and modifier 212 may store hierarchical structure 300 with pattern representation 160 in a pattern object 218 that is stored in pattern library 214. Alternatively, the pattern representation 160 and hierarchical structure 300 may be stored separately in pattern library 214.

Figure 4:
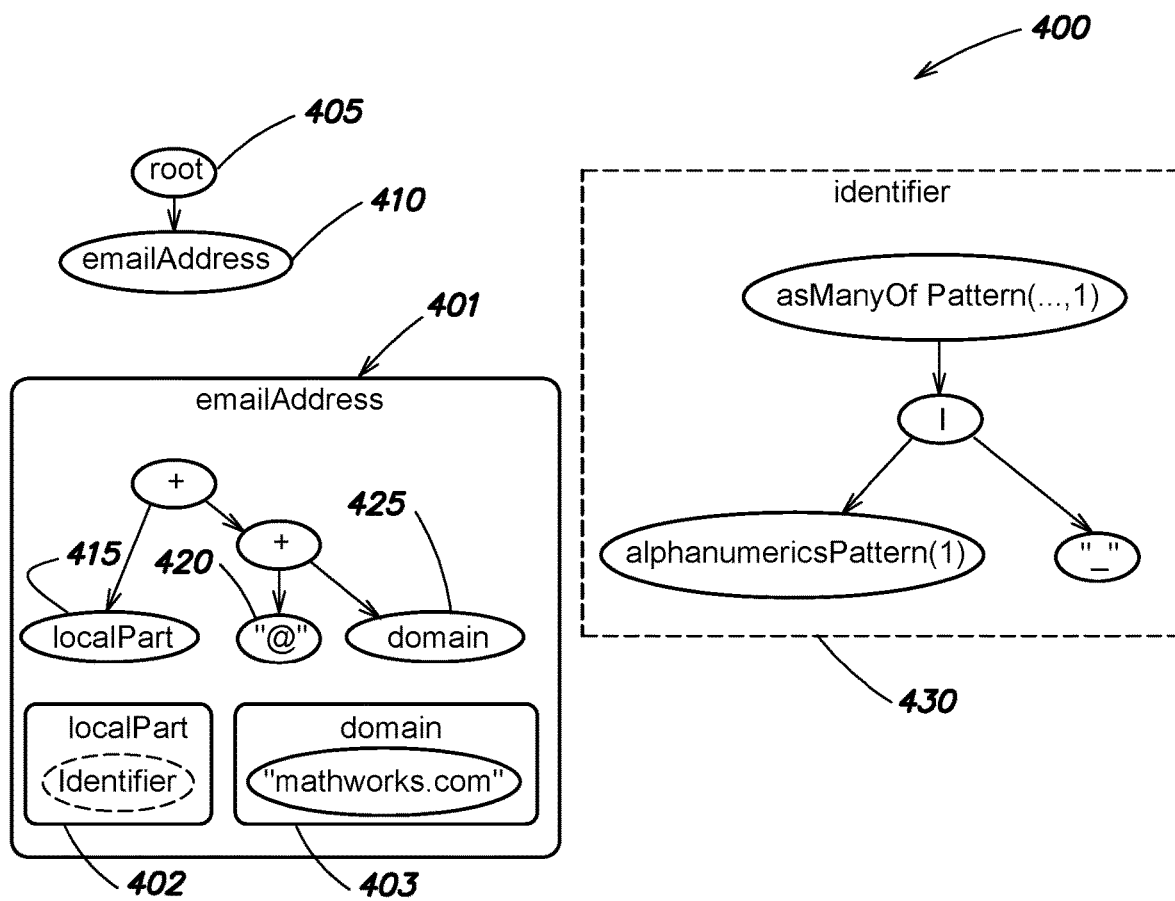
FIG. 4 is an illustration of an example hierarchical structure that is generated based on the execution of the pattern modification instruction of FIG. 1C in accordance with one or more embodiments described herein.

In addition, and when a pattern is modified as described above with reference to FIG. 1C, the pattern generator and modifier 212 may modify one or more values of a hierarchical structure. FIG. 4 is an illustration of an example hierarchical structure 400 that is generated based on the execution of the pattern modification instruction of FIG. 1C in accordance with one or more embodiments described herein.

Specifically, instruction 165 and pattern modification instruction 170 of FIG. 1C may be executed to modify the domain portion of the email address pattern to "mathworks.com". Based on the execution of instruction 165 and pattern modification instruction 170, the pattern generator and modifier 212 may utilize the named patterns, variables/identifiers, and values in instruction 165 and pattern modification instruction 170 to generate hierarchical structure 400 that corresponds to the modified email address pattern. As depicted in FIG. 4, the hierarchical structure 400 includes substructures for the named patterns: emailAddress substructure 401 that defines the overall email address pattern; and localPart substructure 402, domain substructure 403, and identifier substructure 430 for defining various parts of the emailAddress substructure 401. Within the hierarchy 400, the top level includes object 410 for the emailAddress pattern. The next level, e.g., child of the top level, includes objects 415 for the localPart pattern, object 420 for the literal character "@", and object 425 for the domain pattern.

Hierarchical structure 400 includes a root 405 that references object 410 that stores a reference to named pattern emailAddress that is at the top hierarchical level of hierarchical structure 400. As shown in emailAddress substructure 401, the named pattern emailAddress stores references to: object 415 that references the named pattern localPart, object 420 that stores the literal character "@", and object 425 that references named pattern domain.

Named pattern localPart and named pattern domain are at the same hierarchical level of the named pattern hierarchy. Therefore, named pattern localPart and named pattern domain are at a same level of hierarchical structure 400.

As shown in localPart substructure 402, named pattern localPart stores a reference to object 430 that stores the pattern that searches for and identifies all instances of a string, of at least a length of 1, of consecutive alphanumeric characters and/or underscores in the text being searched.

In this example, the values of the named pattern domain that define the domain portion of an email address pattern are modified based on the execution of instruction 165 and pattern modification instruction 170 (e.g., "mathworks.com"). As such, and as shown in domain substructure 403, named pattern domain store the literal string of characters "mathworks.com". Thus, hierarchical structure 400 does not include references to objects that correspond to named patterns subdomain, domainName, and tld that are included in hierarchical structure 300 for the original email address pattern of FIGS. 1A and 1B. Specifically, the pattern generator and modifier 212 may remove the references to the objects (e.g., the objects corresponding to the named patterns subdomain, domainName, and tld) and replace the removed objects with the value "mathworks.com" to generate the hierarchical structure 400. The pattern generator and modifier 212 may store hierarchical structure 400 in a pattern object 218 that is stored in the pattern library 214.

FIG. 5A is an illustration of an example pattern modification instruction for adding a value to the tld portion of the email address pattern of FIG. 1A in accordance with one or more embodiments described herein. In particular, the email address pattern generated in FIGS. 1A-1B includes tld: "com," "gov," and "net." Instructions 500, 505, when executed, adds a value "edu" to the tld such that the email address pattern can have 4 alternative tlds. In the example shown in FIG. 5A, instruction 500 may be input at a CLI and may create a variable named newTLD that stores an instance of the email address pattern generated based on the execution of pattern generating instructions 100. As such, and when the email address pattern in the variable named newTLD is modified/customized, the original email address pattern that was generated based on the execution of pattern generating instructions 100 is not overwritten.

As such, the user may index, utilizing pattern modification instruction 505, into the TLD portion of the email address pattern stored in variable named newTLD to add the "edu" as a value. The pattern modification instruction 505 may be input at a CLI. In addition, pattern modification instruction 505 may be associated with a dot indexing schema or a different accessing schema. Because the TLD portion is to be modified, each named pattern in the named pattern hierarchy from named pattern tld to the top named pattern, emailAddress, is to be included in pattern modification instruction 505. Specifically, pattern modification instruction 505 recites "newTLD.emailAddress.domain.tld" to index into the TLD portion of the email address pattern stored in the variable named newTLD. More specifically, pattern modification instruction 505 identifies the variable (e.g., newTLD) that stores the pattern to be modified, followed by a period, followed by the top named pattern (e.g., emailAddress) in the named pattern hierarchy, followed by a period, followed by the named pattern (e.g., domain) in the second level of the named pattern hierarchy, followed by a period, and followed by the named pattern tld that is to be modified to add a value of "edu".

Pattern modification instruction 505 also includes "=newTLD.emailAddress.domain.tld|"edu". The "newTLD.emailAddress.domain.tld" indicates that the tld portion, of the pattern stored in the variable newTLD, may be one of "com", "gov", or "net", which were the original values stored in named pattern tld. "|"edu"" adds "edu" as an additional value that the tld portion may be. As such, pattern modification instruction 505 defines the tld portion, of the pattern stored in the variable newTLD, as being one of "com", "gov", "net", or "edu". Therefore, based on the execution of pattern modification instruction 505, the pattern generator and modifier 212 may generate the modified email address pattern that is stored in variable named newTLD. Specifically, and based on the execution of instruction 500 and pattern modification instruction 505, pattern generator and modifier 212 may generate pattern representation 510 and hierarchical structure 600, as will be described in further detail below.

Figure 5B:
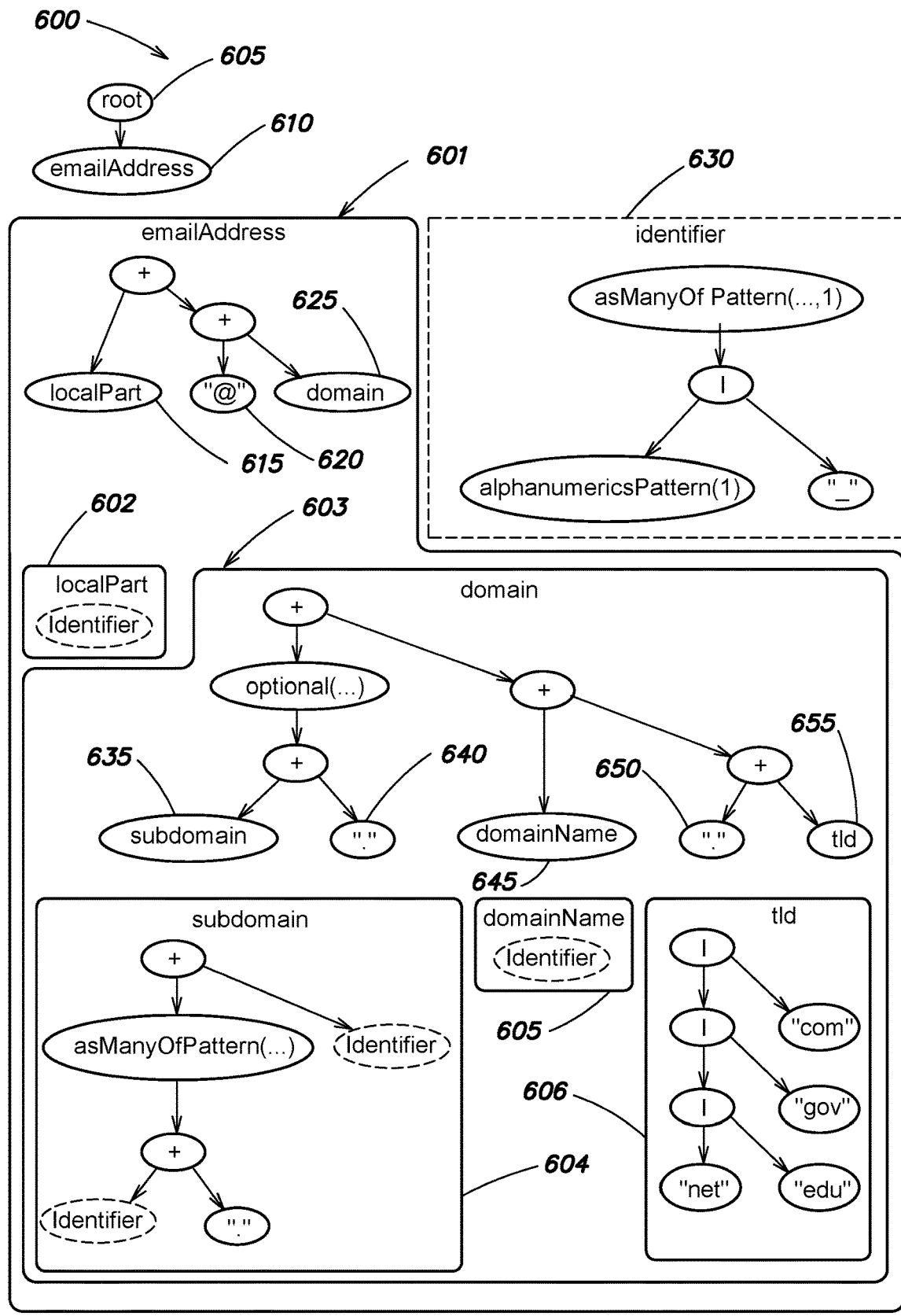
FIG. 5B is an illustration of an example hierarchical structure generated based on the execution of the pattern modification instructions of FIG. 5A in accordance with one or more embodiments described herein.

FIG. 5B is an illustration of an example hierarchical structure 600 generated based on the execution of the pattern modification instructions of FIG. 5A in accordance with one or more embodiments described herein. Specifically, based on the execution of instruction 500 and pattern modification instruction 505 of FIG. 5A, the pattern generator and modifier 212 may generate hierarchical structure 600 that corresponds to the modified email address pattern stored in variable newTLD that modifies the named pattern tld to additional store "edu". As depicted in FIG. 5B, hierarchical structure 600 includes substructures for the named patterns: emailAddress substructure 601 that defines the overall email address pattern; localPart substructure 602, domain substructure 603, and identifier substructure 630 for defining various parts of the emailAddress substructure 601; and subdomain substructure 604, domainName substructure 605, and tld substructure 606 for defining various part of the domain substructure 603.

Within the hierarchy 600, the top level includes object 610 for the emailAddress pattern. The next level, e.g., child of the top level, includes object 615 for the localPart pattern, object 620 for the literal character "@", and object 625 for the domain pattern. The bottom level includes object 635 for the subdomain pattern, object 650 for the literal character ".", object 645 for the domainName pattern, object 650 for the literal character ".", and object 655 for the tld pattern.

Specifically, hierarchical structure 600 includes a root 605 that references object 610 that stores a reference to the named pattern emailAddress. As shown in the emailAddress substructure 601, the named pattern emailAddress stores references to: object 615 that references the named pattern localPart, object 620 that stores the literal character "a", and object 625 that references named pattern domain.

Named pattern localPart and named pattern domain are at the same hierarchical level of the named pattern hierarchy. Therefore, the named pattern localPart and the named pattern domain are at the same hierarchical level of hierarchical structure 600.

As shown in localPart substructure 602, named pattern localPart stores a reference to object 630 that stores the pattern that searches for and identifies all instances of a string, of at least a length of 1, of consecutive alphanumeric characters and/or underscores in the text being searched.

As shown in domain substructure 603, named pattern domain stores values that define the domain portion of the modified email address. Specifically, named pattern domain stores references to: object 635 that references named pattern subdomain, object 640 that stores the literal character ".", object 645 that references named pattern domainName, object 650 that stores the literal character ".", and object 655 that references named pattern tld.

Since the named patterns subdomain, domainName, and tld are at the same hierarchical level of the named pattern hierarchy, objects 635, 645, and 655 are at the same hierarchical level of the hierarchical structure 600.

As shown in subdomain substructure 604 and domainName substructure 605, objects 635 and 645 stores values that respectively define the subdomain and domain name portions of the email address pattern.

In this example, the values of the named pattern tld that define the tld portion of the email address pattern is modified based on the execution of instruction 500 and pattern modification instruction 505 of FIG. 5A to additionally include "edu". As such, and as shown in tld substructure 606, named pattern tld additional stores the literal string of "edu". Specifically, the named pattern tld referenced by object 655 stores values of "com", "gov", "net", and "edu" utilizing pointers and symbols "|". The pattern generator and modifier 212 may store hierarchical structure 600 in a pattern object 218 that is stored in pattern library 214.

Therefore, hierarchical structure 600 includes objects that store values that can be modified/customized, such that a customized pattern may be generated in a user intuitive fashion. Specifically, according to the one or more embodiments described herein, a pattern modification instruction, that may be associated with a dot indexing schema, may be utilized to modify one or more values of the hierarchical structure associated with the pattern. As such, a user is not required to evaluate and decipher a long string of a terse syntax to change one or more characters to modify a pattern that may be required by conventional techniques, e.g., regular expressions. As such, the one or more embodiments described herein provided an improvement in the technological field of computer-based pattern matching.

FIG. 5C is an illustration of an example pattern representation 510 that is generated based on the execution of pattern modification instructions of FIG. 5A in accordance with one or more embodiments described herein. In this example, the pattern generator and modifier 212 may generate pattern representation 510 from hierarchical structure 600. Specifically, the pattern generator and modifier may analyze the hierarchical structure 600 to determine the hierarchy of the named patterns in the modified email address pattern. The pattern generator and modifier 212 may then generate pattern representation 510 based on the analysis such that the relationship of the named patterns in the pattern representation 501, when displayed, corresponds to the relationship of the named patterns in the hierarchical structure 600.

As depicted in FIG. 5C, pattern representation 510 include each of the named patterns included in the modified email address pattern (e.g., named patterns emailAddress, localPart, domain, subdomain, domainName, and tld), where each named pattern is indented a selected amount based on which level, in the hierarchical structure 600, the named pattern is included. In addition, the details associated with each named pattern is included in pattern representation 510. Only the tld portion of the email address pattern was modified based on the execution of pattern modification instruction 505. Accordingly, named patterns emailAddress, localPart, domain, subdomain, and domainName and their details are the same in pattern representations 160 and 510. However, the details of the named pattern tld in pattern representation 510 are different than the details of the named pattern tld in pattern representation 160. Specifically, the details of the named pattern tld in pattern representation 510 indicates that the tld portion of the modified email address pattern is one of "com", "gov", "net", or "edu".

FIGS. 6, 7, 8A, 8B, 9A, and 9B describe example uses of the pattern hierarchical structures constructed by the methods and systems described herein to implement one or more pattern matching functions. Referring to FIG. 6, a pattern matching function is used to search for matching patterns within text. Pattern matching instruction 660 is an example of the contains pattern matching function that determines if a generated or modified pattern is identified within a text. To implement the contains pattern matching function, the contains(text, Pat) pattern matching function may be utilized, where text is the text to be searched and Pat is the pattern that is to be used to search the text. In this example, the email address pattern stored in the variable named mathworksEmailAddress is used by the pattern matcher 216 to search the text in in the first argument in instruction 660. Although pattern matching instruction 660 includes the actual text of the text to be searched, it is expressly contemplated that pattern matching instruction 660 may store a name of one or more stored files or objects that are to be searched.

Based on pattern matching instruction 660, the pattern matcher 216 may translate hierarchical structure 400 into a translated data structure (e.g., a finite state machine). The pattern matcher 216 may determine, utilizing the translated data structure, if one or more consecutive characters of the text in the pattern matching instruction 660 matches the modified email address pattern stored in variable mathworksEmailAddress. In this example, jmac@mathworks.com of the text matches the modified email address pattern, e.g., localPart@mathworks.com. As such and based on the execution of pattern matching instruction 660, the pattern matcher 216 may determine that the modified email address pattern is identified in the text being searched. The pattern matcher 216 may generate output 665, e.g., 1, or identifier, e.g., yes or true, that indicates that the modified email address pattern is identified in the text. If the pattern matcher 216 had determined that the modified pattern was not identified in the text being searched, the pattern matcher 216 may generate a different output, e.g., 0, and/or identifier "no" or "false". Output 665 may, for example, be displayed on a display device.

In another example, FIG. 7 illustrates replacing portions of text using the constructed patterns. In particular, an example replace pattern matching function and associated output in accordance with one or more embodiments described herein are provided. The replace pattern matching function identifies the defined patterns and replaces the identified patterns with replacements. Pattern matching instruction 700 is an example replace pattern matching function that replaces a generated or modified pattern, identified in a text being searched, with one or more new characters to generate modified text. To implement the replace pattern matching function, the replace(text, Pat, NewText) pattern matching function may be utilized, where Prog is the text to be searched, Pat is the pattern that is to be used to search the program, and NewText are the one or more new characters that are to replace the identified pattern in the text to generate new text. In this example, the text in pattern matching instruction 700 is "Send complaints to jmac@mathworks.com, scopper@mathworks.com, or kstyle@gmail.com.", mathworksEmailAddress, "TonyTiger@mathworks.com". As such, in this example, the email address pattern stored in the variable named mathworksEmailAddress is used by the pattern matcher 216 to search the text in instruction 700. In addition, the pattern matcher 216 replaces all instances of the modified email address pattern identified in the text with TonyTiger@mathworks.com to generate modified text. Although pattern matching instruction 700 includes the actual text to be searched, it is expressly contemplated that instruction 700 may store a name of one or more stored files or objects to be searched.

Based on pattern matching instruction 700, the pattern matcher 216 may translate hierarchical structure 400 into a translated data structure (e.g., a finite state machine). The pattern matcher 216 may determine, utilizing the translated data structure, if one or more consecutive characters of the text in pattern matching instruction 700 match the modified email address pattern. In this example, jmac@mathworks.com and scopper@mathworks.com of the text match the modified email address pattern, e.g., localPart@mathworks.com. As such and based on the execution of the replace pattern matching function in pattern matching instruction 700, the pattern matcher 216 replaces jmac@mathworks.com and scopper@mathworks.com with TonyTiger@mathworks.com to generate the modified text that is output 705. The output 705, may, for example, be displayed on a display device.

FIG. 8A illustrates extracting from text what the generated or modified pattern matches in the text to be searched. Pattern matching instruction 800 is an example extract pattern matching function. To implement the extract pattern matching function, the extract(text, Pat) pattern matching function may be utilized, where text is the text to be searched and Pat is the pattern that is to be used to search the text. In this example, the text of pattern matching instruction 800 is "Send complaints to jmac@mathworks.com, scopper@mathworks.com, or kstyle@gmail.com.", mathworksEmailAddress. As such, in this example, the email address pattern stored in the variable named mathworksEmailAddress is used by the pattern matcher 216 to search the text. In addition, the pattern matcher 216 extracts each instance of what the pattern matches in the text. Although pattern matching instruction 800 includes the actual text to be searched, it is expressly contemplated that instruction 800 may store a name of one or more stored files or objects that are to be searched.

Based on pattern matching instruction 800, the pattern matcher 216 may translate hierarchical structure 400 into a translated data structure (e.g., a finite state machine). The pattern matcher 216 may determine, utilizing the translated data structure, if one or more consecutive characters of the text in pattern matching instruction 800 match the modified email address pattern. In this example, jmac@mathworks.com and scopper@mathworks.com of the text match the modified email address pattern, e.g., localPart@mathworks.com. As such and based on the execution of the extract pattern matching function in pattern matching instruction 800, the pattern matcher 216 extracts jmac@mathworks.com and scopper@mathworks.com from the text and provides the extracted email addresses as output 805. Output 805 may, for example, be displayed on a display device.

FIG. 8B is an illustration of extracting and parsing a pattern identified in text. Pattern matching instruction 810 is an example nested capture pattern matching function that may extract a generated or modified pattern in text and then parse the identified pattern based on the named patterns that define the pattern. To implement the nested capture function, a [—, results]=extract(text, Pat) pattern matching function may be utilized, where "—" in the brackets indicates that the first output is requested but ignored, results in the brackets indicates that the identified pattern should be parsed, text is the text to be searched, and Pat is the pattern that is to be used to search the text. In this example, the text of pattern matching instruction 810 is "Contact us at 1ASupporters@mathworks.com", mathworksEmailAddress. As such, in this example, the email address pattern stored in the variable named mathworksEmailAddress is used by the pattern matcher 216 to search the text. In addition, the pattern matcher 216 parses the pattern, if identified in the text, based on the named pattern hierarchy. Although the pattern matching instruction 810 includes the actual text to be searched, it is expressly contemplated that instruction 810 may store a name of one or more stored files or objects to be searched.

Based on pattern matching instruction 810, the pattern matcher 216 may translate hierarchical structure 400 into a translated data structure (e.g., a finite state machine). The pattern matcher 216 may determine, utilizing the translated data structure, if one or more consecutive characters of the text in pattern matching instruction 810 match the modified email address pattern. In this example, 1ASupporters@mathworks.com matches the modified email address pattern, e.g., localPart@mathworks.com. As such, the pattern matcher 216 extracts the identified pattern and parses the identified pattern based on each of the named patterns that define the pattern. Specifically, and as depicted in hierarchical structure 400, the modified email address includes named patterns emailAddress, localPart, domain, subdomain, domainName, and tld. As such, the pattern matcher 216 parses 1ASupporters@mathworks.com according to these named patterns to produce output 815. Specifically, output 815 may be the pattern identified in the text that is parsed according to the named patterns, where the named patterns may be distinguished based on their inclusion at particular hierarchal levels in the named pattern hierarchy. Output 815 may, for example, be displayed on a display device. Advantageously, a user may be able to view the portions of the identified pattern that match each of the named patterns of the pattern, such that the identified pattern is segment according to the named patterns when displayed.

FIG. 9A illustrates indexing into a pattern and selecting a portion of the pattern. Instruction 900 may be input at a CLI and may create a variable named myPattern that stores an instance of the email address pattern generated based on the execution of pattern generating instructions 100. As such, and when the email address pattern in the variable named myPattern is modified/customized, the original email address pattern that was generated based on the execution of pattern generating instructions 100 is not overwritten. In this example, a user may want to see the values stored for named pattern domain.

As such, the user may input a pattern portion selection instruction 905 at a CLI. Pattern portion selection instruction 905 may be associated with a dot indexing schema that or a different accessing schema. Pattern portion selection instruction 905 may index into the domain portion of the email address stored in the variable named myPattern to obtain the values of named pattern domain. Because the values of named pattern domain are requested, each named pattern in the named pattern hierarchy from the named pattern domain to the top named pattern, emailAddress, is to be included in the pattern portion selection instruction. Specifically, the pattern portion selection instruction 905 is "myPattern.emailAddress.domain", which indexes into the domain portion of the email address pattern stored in the variable named myPattern. More specifically, pattern portion selection instruction 905 identifies the variable (e.g., myPattern) that stores the pattern that includes the values, followed by a period, followed by the top named pattern (e.g., emailAddress) in the named pattern hierarchy, followed by a period, followed by the second named pattern (e.g., domain) in the second level of the named pattern hierarchy for which the values are requested.

As such, based on the execution of pattern portion selection instruction 905, the pattern matcher 216 may index into the domain portion of the email address pattern stored in the named variable myPattern to obtain values stored for the named pattern domain. In this example, the named pattern domain is a concatenation of the named pattern subdomain followed by a period (that are optional), named pattern domainName, a period, and named pattern tld in that order. As such, the pattern matcher 216 may obtain and display output 910, on a display screen, that indicates the details associated with the selected pattern, e.g., domain. In addition, because the values stored in named pattern domain are includes references to the named patterns subdomain, domainName, and tld, output 910 may further display these named patterns and their associated details. In addition, the named patterns provided in output 910 may be organized (e.g., indented) to differentiate between named patterns at different hierarchical levels in the named pattern hierarchy that correspond to the hierarchical structure 600. Advantageously, a user may view the values that make up a pattern and/or sub pattern to determine what modifications are to be made such that the pattern can be customized in a particular way and to meet the criteria of the user.

FIG. 9B illustrates replacing a portion of a pattern in relation to a match of the entire pattern. Instruction 915 may be input at a CLI and may create a variable named newDomain that stores an instance of the email address pattern generated based on the execution of pattern generating instructions 100. As such, and when the email address pattern in the variable named newDomain is modified/customized, the original email address pattern that was generated based on the execution of pattern generating instructions 100 is not overwritten. In this example, a user may want to identify and replace, in text to be searched, all instances of the domain portion of an email address with "geocities.com". Specifically, the domain portion of an email address in the context of an email address is preceded by the "@" symbol, which is preceded by a string, of at least a length of 1, of consecutive alphanumeric characters and/or underscores.

Context select instruction 920 may be input in a CLI to select the named pattern domain in the context of the overall email address pattern stored in variable named newDomain. Specifically, and to implement the context select function, the selectPattern (Pat, namedPatternOfInterest) pattern matching function may be utilized, where Pat is the pattern of interest, and namedPatternOfInterest is the named pattern of interest in hierarchical form, as it relates to the pattern (i.e., its context in the pattern). In addition, "newDomain=" of context select instruction 920 stores the pattern, that identifies the domain portion in the context of an email address, in the variable named newDomain. Accordingly, and based on the execution of context select instruction 920, pattern matcher 216 may utilize the pattern stored in the variable newDomain to identify the domain portion in the context of the email address pattern.

Pattern matching instruction 925 is an example replace pattern matching function that replaces a pattern, in text being searched, with one or more new characters to generate a modified program. To implement the replace pattern matching function, the replace(text, Pat, NewText) pattern matching function may be utilized, where text is the text to be searched, Pat is the pattern that is to be used to search the text, and NewText are the one or more new characters that are to replace the identified pattern in the text to generate new text. In this example, the text of pattern matching instruction 925 is "Send complaints to jmac@mathworks.com or scopper@mathworks.com or visit mathworks.com", NewDomain, "geocities.com". As such, in this example, the pattern identifying the domain portion in the context of the email address pattern that is stored in the variable named newDomain is used by the pattern matcher 216 to search the text. In addition, the pattern matcher 216 replaces all instances of the identified domain portion, in the context of the email address pattern, with geocities.com to generate modified text. Although pattern matching instruction 925 includes the actual text of the program to be searched, it is expressly contemplated that pattern matching instruction 925 may store a name of one or more stored files or objects that are to be searched.

Based on pattern matching instruction 925, the pattern matcher 216 may translate hierarchical structure 400 into a translated data structure (e.g., a finite state machine). The pattern matcher 216 may determine, utilizing the translated data structure, if one or more consecutive characters of the text match the domain portion in the context of the email address pattern. In this example, jmac@mathworks.com and scopper@mathworks.com of the text match the domain portion in the context of the email address pattern. However, just "mathworks.com" in the text does not, because it is not preceded by a "@" symbol and a string, of at least a length of 1, of consecutive alphanumeric characters and/or underscores. As such and based on the execution of the replace pattern matching function in pattern matching instruction 925, the pattern matcher 216 replaces the "mathworks.com" portions of jmac@mathworks.com and scopper@mathworks.com with geocities.com to generate the modified text that is output 930. Output 930, may, for example, be displayed on a display device.

As such, the pattern matching functions as described herein (e.g., contains, count, replace, extract, context select, nested capture) allow a user to implement robust pattern matching functions through use of easy and intuitive commands. For example, a user may view a pattern representation of the preconstructed pattern, generated according to the one or more embodiments described herein, to easily decipher and understand the preconstructed pattern. By obtaining a clear understanding of the pattern, the user may implement any of a variety of different pattern matching functions to search text utilizing user intuitive commands according to the one or more embodiments described herein.

Although FIGS. 1D and 6-9B describe the user of particular pattern matching functions, it is expressly contemplated that the one or more embodiments described herein may utilize additional or different pattern matching functions. For example, additional pattern matching functions may include, but are not limited to, inserting text after an identified pattern, inserting text before an identified pattern, identifying a pattern that ends with one or more characters, identifying a pattern that starts with one or more characters, etc. In addition, it is expressly contemplated that different programming environment may utilize different pattern matching functions.

Figure 10:
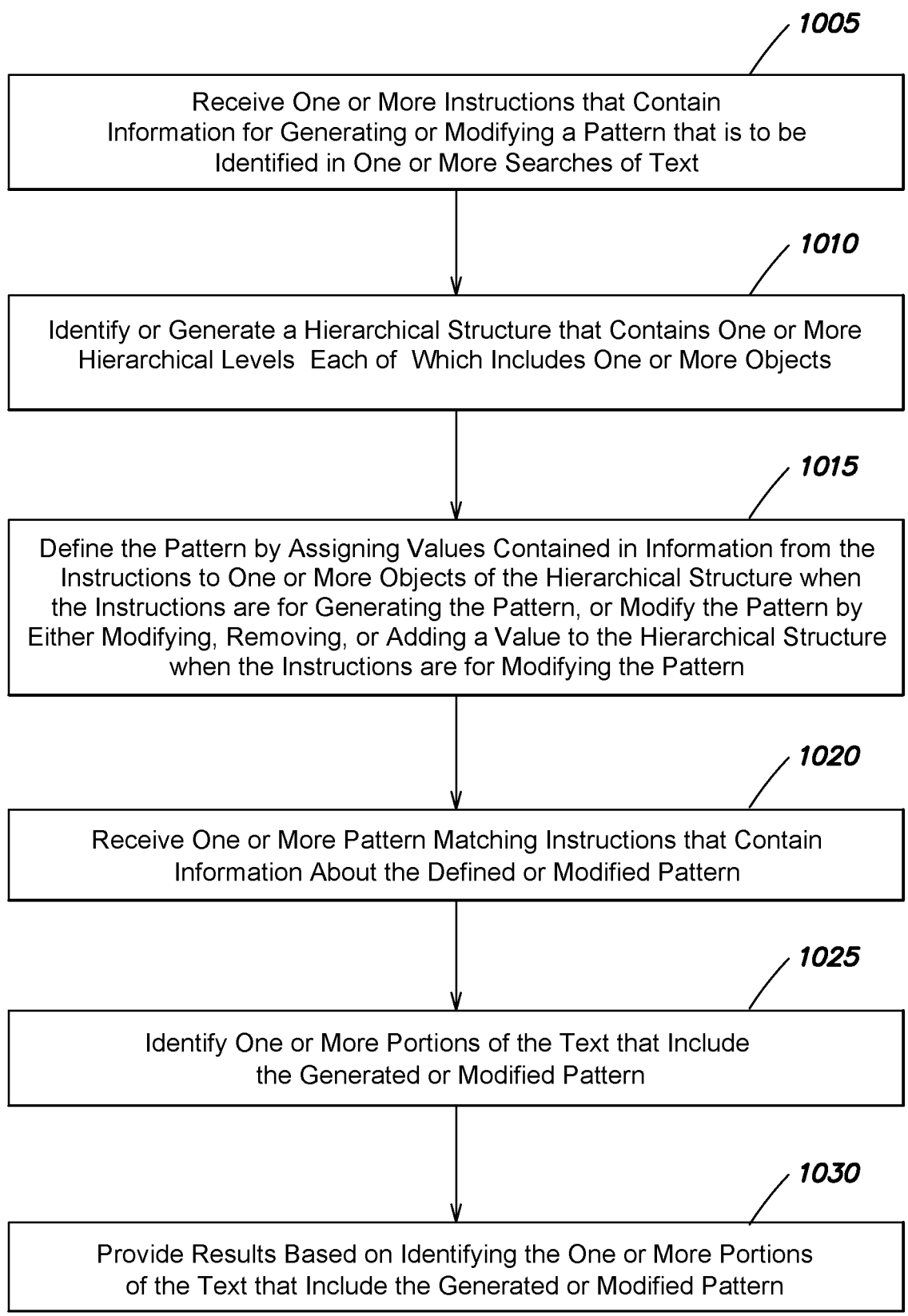
FIG. 10 is a flow diagram of an example method for generating or modifying a pattern for pattern matching utilizing a hierarchical structure that stores one or more values.

FIG. 10 is a flow diagram of an example method for generating or modifying a pattern for pattern matching utilizing a hierarchical structure that stores one or more values.

The pattern generator and modifier 212, at block 1005, may receive one or more instructions that contain information for generating or modifying a pattern that is to be identified in one or more searches in text. For example, the text may be created in created in one or more programing languages. In an embodiment, the one or more instructions may be received at a CLI. The pattern generator and modifier 212, at block 1010, may identify or generate a hierarchical structure that contains hierarchical levels each of which includes one or more objects. For example, the hierarchical structure may include one level or a plurality of levels. Specifically, when the instructions are for generating the pattern, the instructions may be executed and the pattern generator and modifier 212 may generate a pattern object that includes a hierarchical structure. When the instructions are for modifying the pattern, the pattern generator and modifier 212 may identify the hierarchical structure based on information in the instructions. In an embodiment, a pattern representation may be generated and displayed on a display device, for example, based on a user request.

The pattern generator and modifier 212, at block 1015, may define the pattern by assigning values contained in information from the instructions to one or more objects of the hierarchical structure when the instructions are for generating the pattern, or may modify the pattern by either modifying, removing, or adding a value to the hierarchical structure when the instructions are for modifying the pattern.

The pattern matcher 216, at block 1020, may receive one or more pattern matching instructions that contain information about the defined or modified pattern. The information may include one or more pattern matching functions. For example, the pattern matching functions may include, but are not limited to, a contains pattern matching function that determines whether the generated or modified pattern is identified in the text, a count pattern matching function that determines a number of occurrences the generated or modified pattern is identified in the text, an extract pattern matching function that extracts portions of the text that match the generated or modified pattern, a replace pattern matching function that replaces the generated or modified pattern identified in the text with one or more new characters to generate a modified text, or a pattern portion selection pattern matching function to obtain information about one or more portions of a pattern.

The pattern matcher 216, at block 1025, may identify one or more portions of the text that include the generated or modified pattern. For example, the pattern matcher 216 may translate the hierarchical structure into a translated data structure (e.g., finite state machine), and then determine, utilizing the translated data structure, if one or more consecutive characters of the text match the generated or modified pattern.

The Pattern matcher 216, at block 1030, may then provide results based on identifying the one or more portions of the text that include the generated or modified text. For example, the pattern matcher 216 may provide the results of the implemented pattern matching function.

Exemplary programming environments 200 suitable for use with the present disclosure include, but are not limited to, the MATLAB® language/programming environment and the Simulink® simulation environment both from The MathWorks, Inc. of Natick, Mass., as well as Visual Studio® from Microsoft Corp of Redwood Calif., Python, Julia, C, C++, C#, SystemC, FORTRAN, Java, Javascript, Swfit, etc.

The generated code may be textual code, such as textual source code, that may be compiled, for example by the compiler 210, and executed on a target machine or device. The generated code may conform to one or more programming languages, such as Ada, Basic, C, C++, C#, SystemC, FORTRAN, Python, JavaScript, Java, Swift, GoLang, Julia, etc., or to a hardware description language, such as VHDL, Verilog, a vendor or target specific HDL code, such as Xilinx FPGA libraries, assembly code, etc.

Figure 11:
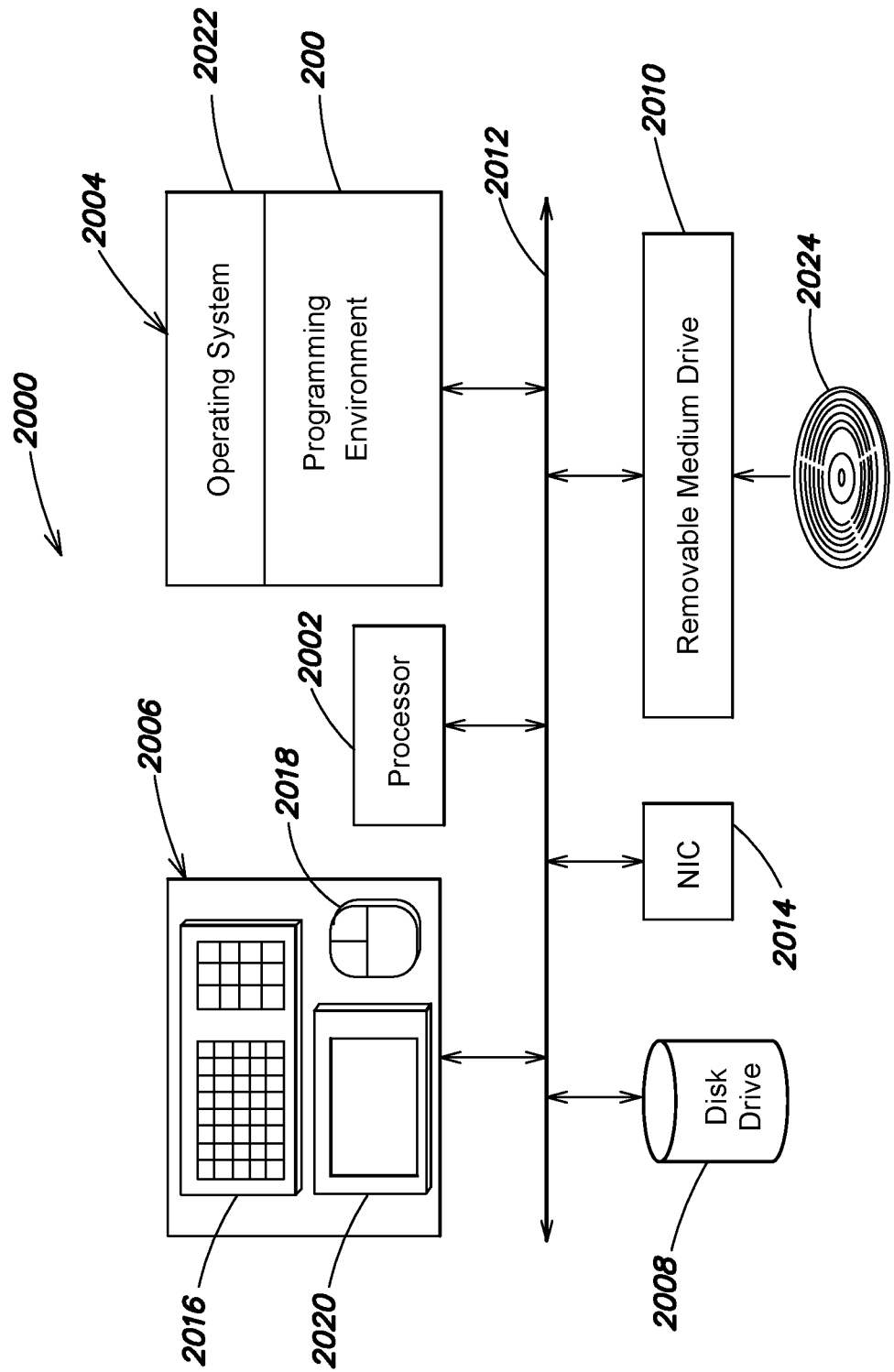
FIG. 11 is a schematic illustration of a computer or data processing system 2000 for implementing one or more embodiments described herein.

FIG. 11 is a schematic illustration of a computer or data processing system 2000 for implementing one or more embodiments described herein. The computer system 2000 may include one or more processing elements, such as a processor 2002, a main memory 2004, user input/output (I/O) 2006, a persistent data storage unit, such as a disk drive 2008, and a removable medium drive 2010 that are interconnected by a system bus 2012. The computer system 2000 may also include a communication unit, such as a network interface card (NIC) 2014. The user I/O 2006 may include a keyboard 2016, a pointing device, such as a mouse 2018, and a display 2020. Other user I/O 2006 components include voice or speech command systems, other pointing devices include touchpads and touchscreens, and other output devices besides a display, include a printer, a projector, a touchscreen, etc. Exemplary processing elements include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 2004, which may be a Random Access Memory (RAM), may store a plurality of program libraries or modules, such as an operating system 2022, and one or more application programs that interface to the operating system 2022, such as the program environment 200. One or more objects or data structures may also be stored in the main memory 2004, such as programs, pattern objects 218, pattern generating instructions 100, among other data structures.

The removable medium drive 2010 may accept and read one or more computer readable media 2024, such as a CD, DVD, floppy disk, solid state drive, tape, flash memory or other media. The removable medium drive 2010 may also write to the one or more computer readable media 2024.

Suitable computer systems include personal computers (PCs), workstations, servers, laptops, tablets, palm computers, smart phones, electronic readers, and other portable computing devices, etc. Nonetheless, those skilled in the art will understand that the computer system 2000 of FIG. 11 is intended for illustrative purposes only, and that the present disclosure may be used with other computer systems, data processing systems, or computational devices. The present disclosure may also be used in a networked, e.g., client-server, computer architecture, or a public and/or private cloud computing arrangement. For example, the programming environment 200 may be hosted on a server, and accessed by a remote client through an application hosting system, such as the Remote Desktop Connection tool from Microsoft Corp.

Suitable operating systems 2022 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 2022 may provide services or functions for other modules, such as allocating memory, organizing data according to a file system, prioritizing requests, etc. The operating system 2022 may run on a virtual machine, which may be provided by the data processing system 2000.

As indicated above, a user or developer, such as an engineer, scientist, programmer, etc., may utilize one or more input devices, such as the keyboard 2016, the mouse 2018, and the display 2020 to operate the programming environment 200, and construct one or more programs that may be stored in program library 206.

Figure 12:
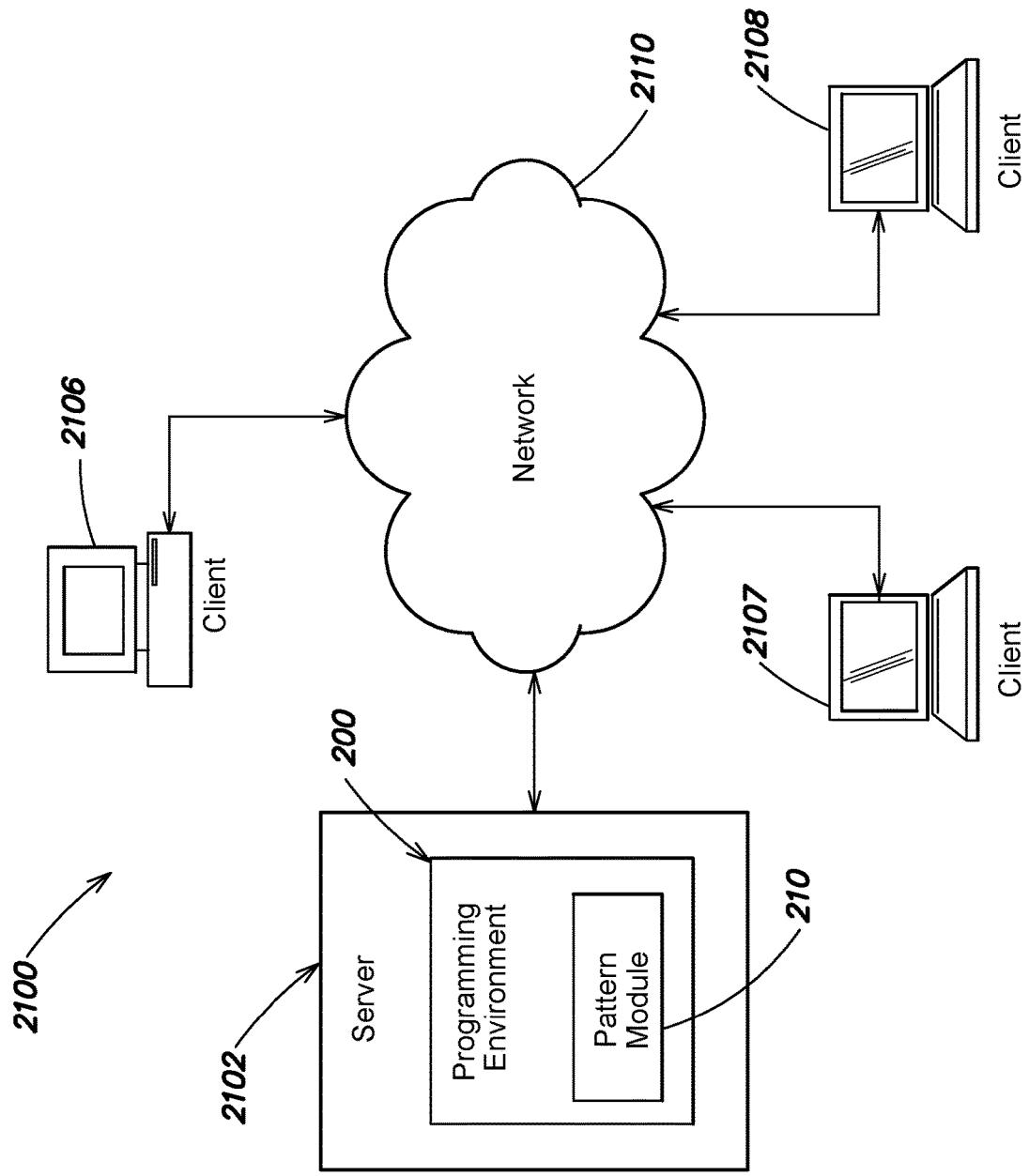
FIG. 12 is a schematic diagram of a distributed computing environment 2100 in which systems and/or methods described herein may be implemented.

FIG. 12 is a schematic diagram of a distributed computing environment 2100 in which systems and/or methods described herein may be implemented. The environment 2100 may include client and server devices, such as server 2102, and three clients 2106-2108, interconnected by one or more networks, such as network 2110. The devices of the environment 2100 may be interconnected via wired connections, wireless connections, or a combination of wired and wireless connections. The server 2102 may include one or more devices capable of receiving, generating, storing, processing, executing, and/or providing information. For example, the server 2102 may include a computing device, such as a server, a desktop computer, a laptop computer, a tablet computer, a handheld computer, or a similar device.

The clients 2106-2108 may be capable of receiving, generating, storing, processing, executing, and/or providing information. Information may include any type of machine-readable information having substantially any format that may be adapted for use, e.g., in one or more networks and/or with one or more devices. The information may include digital information and/or analog information. The information may further be packetized and/or non-packetized. In an embodiment, the clients 2106-2108 may download data and/or code from the server 2102 via the network 2110. In some implementations, the clients 2106-2108 may be desktop computers, workstations, laptop computers, tablet computers, handheld computers, mobile phones (e.g., smart phones, radiotelephones, etc.), electronic readers, or similar devices. In some implementations, the clients 2106-2108 may receive information from and/or transmit information to the server 2102.

The network 2110 may include one or more wired and/or wireless networks. For example, the network 2110 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. Information may be exchanged between network devices using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

The server 2102 may host applications or processes accessible by the clients 2106-2108. For example, the server 2102 may include the programming environment 200, which may include or have access to the pattern module 210.

The number of devices and/or networks shown in FIG. 12 is provided as an example. In practice, there may be additional devices and/or networks, fewer devices and/or networks, different devices and/or networks, or differently arranged devices and/or networks than those shown in FIG. 12. Furthermore, two or more devices shown in FIG. 12 may be implemented within a single device, or a single device shown in FIG. 12 may be implemented as multiple, distributed devices. Additionally, one or more of the devices of the distributed computing environment 2100 may perform one or more functions described as being performed by another one or more devices of the environment 2100.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system (e.g., system 100) or a human user of a computer or data processing system, unless otherwise stated.

Further, certain embodiments described herein may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 2000. The computer-executable instructions may include instructions that implement one or more embodiments described herein. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages.

What is claimed is:

1. A method comprising:
   receiving one or more first instructions that contain first information for generating or modifying a pattern, wherein the pattern or a part of the pattern is to be identified in one or more searches within a program in one or more programming languages;
   identifying or generating a hierarchical structure containing one or more hierarchical levels, each hierarchical level including one or more objects;
   based on the first information contained in the one or more first instructions,
      defining, by a processor, the pattern by assigning values contained in the first information to the one or more objects of the one or more hierarchical levels of the hierarchical structure, or
      modifying, by the processor, the pattern by performing one or more of modifying a value of the one or more objects of the hierarchical structure,
      removing the value from the hierarchical structure, or adding an additional value to the hierarchical structure;
   receiving one or more second instructions that contain second information that includes at least (1) a selected type of pattern matching, of a plurality of different types of patter matchings, to be implemented to search the program, and (2) a pattern identifier that identifies the generated or modified pattern to be utilized with the selected type of pattern matching to search the program, wherein the plurality of different types of pattern matchings are associated with a plurality of different result information;
   identifying, by the processor, one or more portions of the program that include the generated or modified pattern; and
   after identifying the one or more portions of the program that include the generated or modified pattern,
      generating particular result information, of the plurality of different result information, utilizing the selected type of pattern matching.

2. The method of claim 1, further comprising:
   translating the hierarchical structure into a translated data structure;
   determining, utilizing the translated data structure, if one or more consecutive characters of the program match the generated or modified pattern; and
   displaying, on a computer display, the result information indicating that the generated or modified pattern is identified in the program in response to determining the one or more consecutive characters of the program match the generated or modified pattern, or
   displaying, on the computer display, the result information indicating that the generated or modified pattern is not identified in the program in response to determining the one or more consecutive characters of the program do not match the generated or modified pattern.

3. The method of claim 1, further comprising:
   translating the hierarchical structure into a translated data structure;
   determining, utilizing the translated data structure, a number of occurrences of one or more consecutive characters of the program that match the generated or modified pattern; and
   displaying, on a computer display, the result information indicating the number of occurrences of the one or more consecutive characters of the program that match the generated or modified pattern.

4. The method of claim 1, further comprising:
   translating the hierarchical structure into a translated data structure;
   identifying, utilizing the translated data structure, one or more consecutive characters that match the generated or modified pattern from the program; and
   displaying, on a computer display, the result information indicating the one or more consecutive characters of the program that match the generated or modified pattern.

5. The method of claim 4, wherein the generated or modified pattern includes at least two sub-patterns, the method further comprising:
   identifying, from the one or more consecutive characters, a first portion of the one or more consecutive characters that matches a first sub-pattern of the at least two sub-patterns;
   identifying, from the one or more consecutive characters, a second portion of the one or more consecutive characters that matches a second sub-pattern of the at least two sub-patterns; and
   displaying, on the computer display, the first portion that matches the first sub-pattern and the second portion that matches the second sub-pattern, wherein the first portion and the second portion are displayed separately from each other.

6. The method of claim 1, further comprising:
   translating the hierarchical structure into a translated data structure;
   determining, utilizing the translated data structure, if one or more consecutive characters of the program match the generated or modified pattern; and
   in response to determining that the one or more consecutive characters of the program matches the generated or modified pattern, replacing the one or more consecutive characters of the program with one or more new characters, included in the second information, to generate a modified program that includes the one or more new characters instead of the one or more consecutive characters.

7. The method of claim 1, further comprising:
   receiving one or more third instructions including an identifier to select a segment of the generated or modified pattern;
   determining a sub-pattern of the generated or modified pattern that has a sub-pattern identifier that corresponds to the identifier included in the third instructions; and
   displaying, on a computer display, the sub-pattern of the generated or modified pattern and one or more subpattern values assigned to one or more sub-pattern objects in the hierarchical data structure.

8. The method of claim 1, wherein the one or more first instructions and the one or more second instructions are formatted according to a dot indexing schema.

9. A system, comprising:
a processor coupled to a memory, the processor configured to:
receive one or more first instructions that contain first information for generating or modifying a pattern, wherein the pattern or a part of the pattern is to be identified in one or more searches within a program in one or more programming languages;
identify or generate a hierarchical structure containing one or more hierarchical levels, each hierarchical level including one or more objects;
based on the first information contained in the one or more first instructions,
define the pattern by assigning values contained in the first information to the one or more objects of the one or more hierarchical levels of the hierarchical structure, or
modify the pattern by performing one or more of modifying a value of the one or more objects of the hierarchical structure, removing the value from the hierarchical structure, or adding an additional value to the hierarchical structure;
receive one or more second instructions that contain second information that includes at least (1) a selected type of pattern matching, of a plurality of different types of pattern matching, to be implemented to search the program, and (2) a pattern identifier that identifies the generated or modified pattern to be utilized with the selected type of pattern matching to search the program, wherein the plurality of different types of pattern matchings are associated with a plurality of different result information;
identify one or more portions of the program that include the generated or modified pattern; and
after identifying the one or more portions of the program that include the generated or modified pattern, generate particular result information, of the plurality of different result information, utilizing the selected type of pattern matching.

10. The system of claim 9, wherein the processor is further configured to:
translate the hierarchical structure into a translated data structure;
determine, utilizing the translated data structure, if one or more consecutive characters of the program match the generated or modified pattern; and
display, on a computer display, the result information indicating that the generated or modified pattern is identified in the program in response to determining the one or more consecutive characters of the program match the generated or modified pattern, or
display, on the computer display, the result information indicating that the generated or modified pattern is not identified in the program in response to determining the one or more consecutive characters of the program do not match the generated or modified pattern.

11. The system of claim 9, wherein the processor is further configured to:
translate the hierarchical structure into a translated data structure;
determine, utilizing the translated data structure, a number of occurrences of one or more consecutive characters of the program that match the generated or modified pattern; and
display, on a computer display, the result information indicating the number of occurrences of the one or more consecutive characters of the program that match the generated or modified pattern.

12. The system of claim 9, wherein the processor is further configured to:
translate the hierarchical structure into a translated data structure;
identify, utilizing the translated data structure, one or more consecutive characters that match the generated or modified pattern from the program; and
display, on a computer display, the result information indicating the one or more consecutive characters of the program that match the generated or modified pattern.

13. The system of claim 12, wherein the generated or modified pattern includes at least two sub-patterns, the processor further configured to:
identify, from the one or more consecutive characters, a first portion of the one or more consecutive characters that matches a first sub-pattern of the at least two sub-patterns;
identify, from the one or more consecutive characters, a second portion of the one or more consecutive characters that matches a second sub-pattern of the at least two sub-patterns; and
display, on the computer display, the first portion that matches the first sub-pattern and the second portion that matches the second sub-pattern, wherein the first portion and the second portion are displayed separately from each other.

14. The system of claim 9, wherein the processor is further configured to:
translate the hierarchical structure into a translated data structure;
determine, utilizing the translated data structure, if one or more consecutive characters of the program match the generated or modified pattern; and
in response to determining that the one or more consecutive characters of the program matches the generated or modified pattern, replace the one or more consecutive characters of the program with one or more new characters, included in the second information, to generate a modified program that includes the one or more new characters instead of the one or more consecutive characters.

15. The system of claim 9, wherein the processor is further configured to:
receive one or more third instructions including an identifier to select a segment of the generated or modified pattern;
determine a sub-pattern of the generated or modified pattern that has a sub-pattern identifier that corresponds to the identifier included in the third instructions; and
display, on a computer display, the sub-pattern of the generated or modified pattern and one or more sub-pattern values assigned to one or more sub-pattern objects in the hierarchical data structure.

16. One or more non-transitory computer-readable media, having stored thereon instructions that when executed by a computing device, cause the computing device to perform operations comprising:
receiving one or more first instructions that contain first information for generating or modifying a pattern, wherein the pattern or a part of the pattern is to be identified in one or more searches within a program in one or more programming languages;

identifying or generating a hierarchical structure containing one or more hierarchical levels, each hierarchical level including one or more objects;

based on the first information contained in the one or more first instructions, defining, by a processor, the pattern by assigning values contained in the first information to the one or more objects of the one or more hierarchical levels of the hierarchical structure, or modifying, by the processor, the pattern by performing one or more of modifying a value of the one or more objects of the hierarchical structure, removing the value from the hierarchical structure, or adding an additional value to the hierarchical structure;

receiving one or more second instructions that contain second information that includes at least (1) a selected type of pattern matching, of a plurality of different types of pattern matching, to be implemented to search the program, and (2) a pattern identifier that identifies the generated or modified pattern to be utilized with the selected type of pattern matching to search the program, wherein the plurality of different types of pattern matchings are associated with a plurality of different result information;

identifying one or more portions of the program that include the generated or modified pattern; and after identifying the one or more portions of the program that include the generated or modified pattern, generating particular result information, of the plurality of different result information, utilizing the selected type of patter matching.

17. The one or more non-transitory computer-readable media of claim 16, wherein the instructions cause the computing device to perform operations further comprising:

translating the hierarchical structure into a translated data structure;

determining, utilizing the translated data structure, if one or more consecutive characters of the program match the generated or modified pattern; and displaying, on a computer display, the result information indicating that the generated or modified pattern is identified in the program in response to determining the one or more consecutive characters of the program match the generated or modified pattern, or displaying, on the computer display, the result information indicating that the generated or modified pattern is not identified in the program in response to determining the one or more consecutive characters of the program do not match the generated or modified pattern.

18. The one or more non-transitory computer-readable media of claim 16, wherein the instructions cause the computing device to perform operations further comprising:

translating the hierarchical structure into a translated data structure;

determining, utilizing the translated data structure, a number of occurrences of one or more consecutive characters of the program that match the generated or modified pattern; and displaying, on a computer display, the result information indicating the number of occurrences of the one or more consecutive characters of the program that match the generated or modified pattern.

19. The one or more non-transitory computer-readable media of claim 16, wherein the instructions cause the computing device to perform operations further comprising:

translating the hierarchical structure into a translated data structure;

identifying, utilizing the translated data structure, one or more consecutive characters that match the generated or modified pattern from the program; and displaying, on a computer display, the result information indicating the one or more consecutive characters of the program that match the generated or modified pattern.

20. The one or more non-transitory computer-readable media of claim 19, wherein the generated or modified pattern includes at least two sub-patterns, and wherein the instructions cause the computing device to perform operations further comprising:

identifying, from the one or more consecutive characters, a first portion of the one or more consecutive characters that matches a first sub-pattern of the at least two sub-patterns;

identifying, from the one or more consecutive characters, a second portion of the or one more consecutive characters that matches a second sub-pattern of the at least two sub-patterns; and displaying, on the computer display, the first portion that matches the first sub-pattern and the second portion that matches the second sub-pattern, wherein the first portion and the second portion are displayed separately from each other.

* * * * *